(12) United States Patent
Taniguchi et al.

(10) Patent No.: US 10,523,398 B2
(45) Date of Patent: Dec. 31, 2019

(54) ELECTRONIC APPARATUS AND WIRELESS COMMUNICATION METHOD

(71) Applicant: KABUSHIKI KAISHA TOSHIBA, Minato-ku, Tokyo (JP)

(72) Inventors: Kentaro Taniguchi, Kanagawa (JP); Toshihisa Nabetani, Kanagawa (JP); Ryota Sekiya, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 15/902,224

(22) Filed: Feb. 22, 2018

(65) Prior Publication Data
US 2019/0058568 A1   Feb. 21, 2019

(30) Foreign Application Priority Data

Aug. 21, 2017   (JP) .................................. 2017-158590

(51) Int. Cl.
| | |
|---|---|
| *H04L 5/00* | (2006.01) |
| *H04L 1/18* | (2006.01) |
| *H04W 72/04* | (2009.01) |
| *H04W 88/08* | (2009.01) |
| *H04L 27/18* | (2006.01) |
| *H04W 84/12* | (2009.01) |

(52) U.S. Cl.
CPC .......... *H04L 5/0055* (2013.01); *H04L 1/1812* (2013.01); *H04L 1/1816* (2013.01); *H04L 1/1819* (2013.01); *H04L 1/1896* (2013.01); *H04L 27/18* (2013.01); *H04W 72/0453* (2013.01); *H04W 88/08* (2013.01); *H04W 84/12* (2013.01)

(58) Field of Classification Search
CPC ... H04L 5/0055; H04L 1/1812; H04L 1/1816; H04L 1/1819; H04L 27/18; H04W 72/0453; H04W 88/08; H04W 84/12
USPC .......................................................... 370/310
See application file for complete search history.

(56) References Cited

U.S. PATENT DOCUMENTS 9,386,585 B2   7/2016 Merlin et al.
2005/0249244 A1   11/2005 McNamara et al.
(Continued)

FOREIGN PATENT DOCUMENTS

| JP | 2005-260939 A | 9/2005 |
|---|---|---|
| JP | 2016-525318 A | 8/2016 |

*Primary Examiner* — Sai Ming Chan
(74) *Attorney, Agent, or Firm* — Foley & Lardner LLP

(57) ABSTRACT

According to one embodiment, an electronic apparatus includes controller circuitry, transmitter circuitry, and receiver circuitry. The controller circuitry is configured to judge whether a payload for a first packet comprises retransmission data; set a first PHY header for the first packet, when the payload does not comprise the retransmission data; set a second PHY header for the first packet, when the payload includes the retransmission data, wherein the second PHY header comprises an amount of information larger than an amount of information of the first PHY header; and generate the first packet comprising the payload and either one of the first PHY header or the second PHY header set for the first packet. The transmitter circuitry is configured to transmit the first packet. The receiver circuitry is configured to receive an ACK signal or a NACK signal for the first packet.

13 Claims, 13 Drawing Sheets

(56) References Cited

U.S. PATENT DOCUMENTS

| | | | |
|---|---|---|---|
| 2011/0280168 A1* | 11/2011 | Lee | H04W 52/0203 |
| | | | 370/311 |
| 2013/0084795 A1* | 4/2013 | Van Phan | H04B 7/15592 |
| | | | 455/15 |
| 2016/0050093 A1* | 2/2016 | Choi | H04L 27/2602 |
| | | | 375/308 |
| 2016/0365952 A1* | 12/2016 | Kim | H04L 1/0083 |
| 2017/0230149 A1* | 8/2017 | Wang | H04L 1/0057 |

* cited by examiner

ELECTRONIC APPARATUS AND WIRELESS COMMUNICATION METHOD

CROSS REFERENCE TO RELATED APPLICATIONS

This application is based upon and claims the benefit of priority from Japanese Patent Application No. 2017-158590, filed on Aug. 21, 2017, the entire contents of which are incorporated herein by reference.

FIELD

Embodiments described herein relate to an electronic apparatus and a wireless communication method.

BACKGROUND

Hybrid automatic retransmission control (HARQ: Hybrid Automatic Repeat Request) for, when an error of a packet from a transmitter received by a receiver is detected, synthesizing reliability information (likelihood information) of a packet retransmitted from the transmitter with likelihood information of the first received packet to improve a signal quality is known. In error correction using HARQ in wireless communication, necessary information is stored in a physical layer (PHY) header, for example. More specifically, a scrambling initial value is stored in the PHY header to improve reliability of scrambling processing or a destination address is stored in the PHY header to improve efficiency of decoding processing in the receiver and reduce power consumption.

However, in the above example, because the scrambling initial value or the destination address information is always stored in the PHY header, an information amount of the PHY header increases. As a result, an overhead increases and communication efficiency is degraded.

DETAILED DESCRIPTION

According to one embodiment, an electronic apparatus includes controller circuitry, transmitter circuitry, and receiver circuitry. The controller circuitry is configured to judge whether a payload for a first packet comprises retransmission data; set a first PHY header for the first packet, when the payload does not comprise the retransmission data; set a second PHY header for the first packet, when the payload includes the retransmission data, wherein the second PHY header comprises an amount of information larger than an amount of information of the first PHY header; and generate the first packet comprising the payload and either one of the first PHY header or the second PHY header set for the first packet. The transmitter circuitry is configured to transmit the first packet. The receiver circuitry is configured to receive an ACK signal or a NACK signal for the first packet.

Hereinafter, embodiments of the present invention will be described with reference to the drawings. All of the embodiments described below relate to a wireless communication device that improves efficiency of HARQ.

HARQ is used as a method of improving band utilization efficiency in wireless packet communication. This HARQ is used in wireless communication such as high speed downlink packet access (HSDPA) and long term evolution (LTE), for example. In HARQ, when an error occurs at the receiver side, a retransmission packet is transmitted from the transmitter side and a signal quality is improved by synthesizing reliability information at the receiver side. As reliability technology, there is a method of improving the signal quality by synthesizing a log likelihood ratio (LLR). In HARQ, two methods are mainly used.

A first method is a chase combining (CC) method. In the CC method, a transmitter transmits the same data in a first transmission packet and a retransmission packet and likelihood synthesis is performed in a receiver. By this likelihood synthesis, an influence of noise can be alleviated and a quality of a received signal can be improved.

A second method is an incremental redundancy (IR) method. In the IR method, the transmitter transmits partially or entirely different data in the first transmission packet and the retransmission packet. When a redundant encoded signal is transmitted in the first transmission packet and error correction cannot be performed in the receiver, the transmitter transmits an additional redundant signal in the retransmission packet. In the receiver, the likelihood of the first transmission packet and the likelihood of the retransmission packet are synthesized, so that it is possible to improve the error correction capability and improve the reception performance. This embodiment can be applied to any one of the two methods of the CC method and the IR method.

Figure 1:
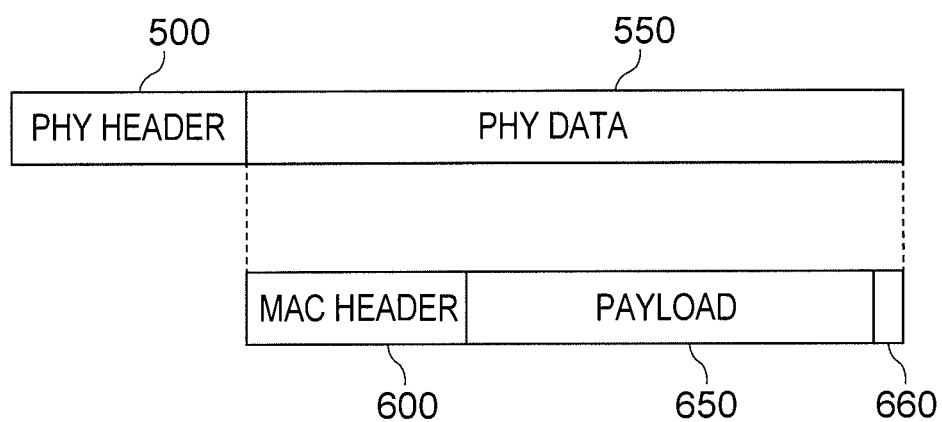
FIG. 1 is a diagram showing a packet configuration used for wireless communication.

FIG. 1 is a diagram showing a configuration of a packet generally used as a wireless communication packet. The packet includes a PHY header 500 located at a head and PHY data 550 located subsequently. The PHY data 550 includes a MAC header 600 and a payload 650. The PHY data 550 may further include error detection bits (a sequence) referred to as a frame check sequence (FCS) of four bytes. The PHY data 550 is also referred to as a MAC frame.

Information necessary for signal processing of a physical layer is stored in the PHY header 500. Information necessary for signal processing of a media access control layer (MAC layer) is stored in the MAC header 600. In the receiver, decoding processing (hereinafter, referred to as decoding) of the payload 650 is performed after the information stored in the headers is read.

Figure 2:
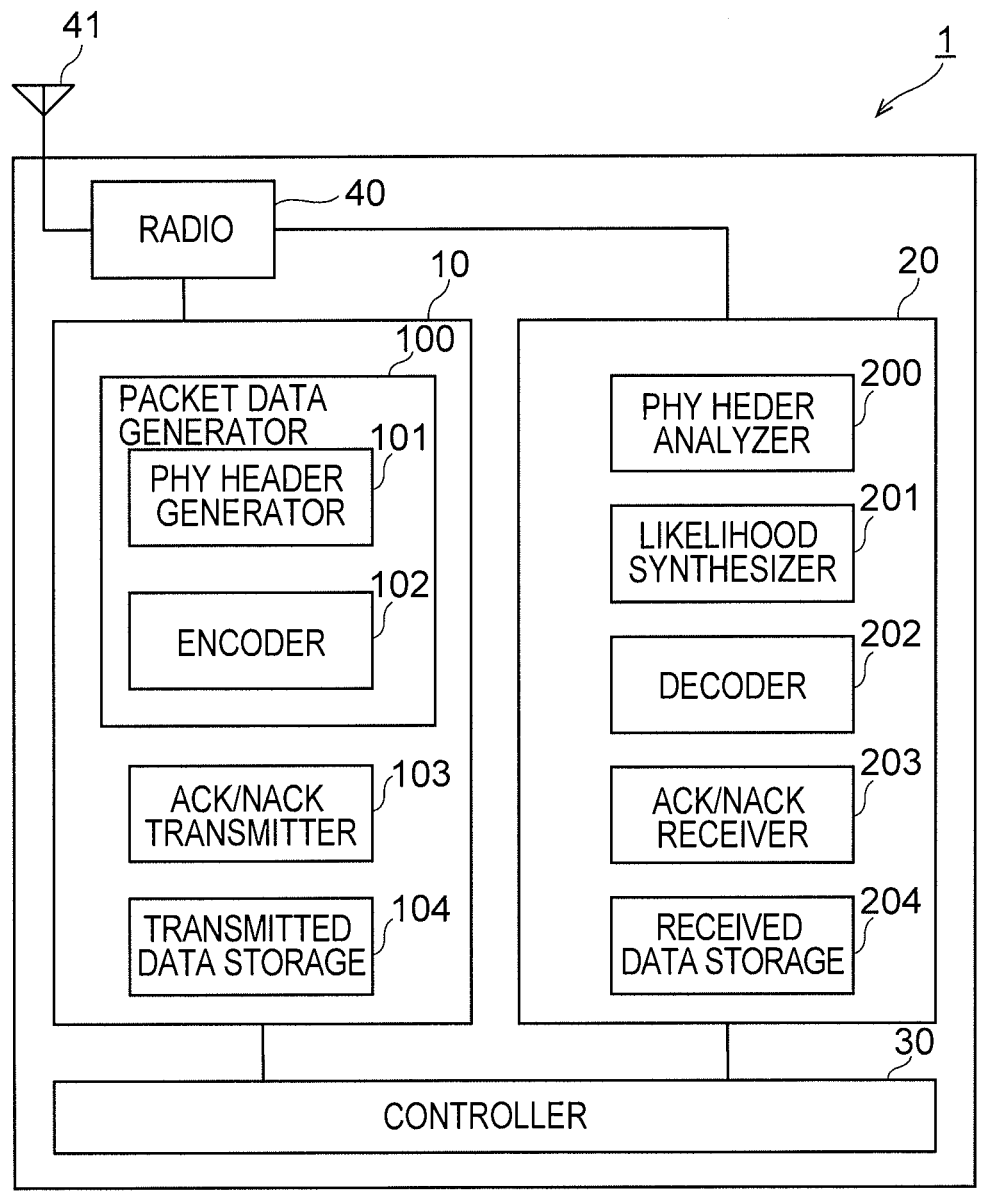
FIG. 2 is a block diagram showing a function of a wireless communication device according to an embodiment.

FIG. 2 is a block diagram showing a function of a wireless communication device 1 according to this embodiment. A wireless communication device 1 includes a transmitter 10, a receiver 20, a controller 30, and a radio 40.

The transmitter 10 includes a packet data generator 100, an ACK/NACK transmitter 103, and a transmitted packet storage 104 and transmits a radio signal.

The packet data generator 100 includes a PHY header generator 101 and an encoder 102 and generates packet data to be transmitted. Although not described in detail in this embodiment, the packet data generator 100 may further include portions necessary for generating the packet data, such as a MAC header generator to generate the MAC header 600 and a data acquirer to acquire data of the payload 650.

The PHY header generator 101 generates the PHY header 500 included in the packet data. An operation of the PHY header generator 101 will be described in detail later.

The encoder 102 performs encoding of the packet data. Although various methods are considered for the encoding, in this embodiment, the encoding is not particularly limited. In addition, the encoder 102 may perform scrambling and encryption of data of the payload 650. In addition, when MAC frames are aggregated, processing for aggregating these frames may be executed.

When the receiver 20 receives data, the ACK/NACK transmitter 103 transmits a signal showing whether or not reception has been normally performed. When the reception has been normally performed, an acknowledgement (ACK) packet is transmitted to the wireless communication device having transmitted the signal and when the reception has not been normally performed, the ACK packet is not transmitted. As another method, when the reception has been normally performed, nothing is transmitted and when the reception has not been normally performed, a negative acknowledgement (NACK) packet is transmitted to the wireless communication device having transmitted the signal. In addition, both the ACK packet and the NACK packet may be used.

The ACK packet or the NACK packet is returned within a constant time after the first transmission packet is received. A time interval to the transmission of the ACK packet is defined by the wireless communication standard and is defined as a short inter frame space (SIFS) time in a wireless local area network (LAN) such as IEEE802.11ac, for example. The SIFS time is defined as a different time interval according to the standard and is defined as 16 usec in IEEE802.11ac, for example.

The transmitted packet storage 104 stores the packet data transmitted from the transmitter 10. The stored packet data may be used at the time of retransmission.

The receiver 20 includes a PHY header analyzer 200, a likelihood synthesizer 201, a decoder 202, an ACK/NACK receiver 203, and a received packet storage 204 and receives a radio signal.

The PHY header analyzer 200 analyzes the PHY header 500 in the received packet data. An operation of the PHY header analyzer 200 will be described in detail later.

When the retransmission packet is received, the likelihood synthesizer 201 determines whether or not data of the payload 650 has been normally received, by performing likelihood synthesis in the data of the payload 650.

The decoder 202 performs decoding of the received packet. Like the encoding, various methods are considered for the decoding. Similar to the encoder 102, the decoder 202 performs descrambling of the payload 650.

The ACK/NACK receiver 203 receives the ACK/NACK signal transmitted from the receiver. The ACK/NACK receiver 203 of the transmitter receives the ACK signal or the NACK signal transmitted from the ACK/NACK transmitter 103 of the receiver, thereby determining whether or not the transmitted packet data has been normally received. Alternatively, it is determined whether or not the packet data has been normally received, according to whether or not the ACK signal has been returned within an assumed time.

The received packet storage 204 stores the received packet data. The stored packet data may be used when the retransmission packet is received.

Each of the transmitted packet storage 104 and the received packet storage 204 may be a volatile memory such as a dynamic random access memory (DRAM) and a static random access memory (SRAM), may be a nonvolatile memory such as a NAND memory and a magnetoresistive random access memory (MRAM), or may be a register circuit.

The controller 30 controls the above processing of the wireless communication device 1 and executes other necessary processing. Other necessary processing is, for example, processing for outputting the received packet data to a necessary calculator. For example, processing of TCP/IP or UDP/IP may be executed by the controller 30 and processing of a higher application layer may be executed by an upper layer. The processing of the upper layer may be executed by software (a program) by a processor such as a central processing unit (CPU), may be executed by hardware, or may be executed by both the software and the hardware. As such, the controller 30 may include the CPU or may be designed with a simpler circuit.

In addition, the controller 30 mainly performs all or a part of the processing of the MAC layer and the processing of the physical layer. The controller 30 may include an UL-MU processor to perform processing regarding UL-MU or a CRC checker to perform CRC checking of frames or packets.

In FIG. 2, although the generation of the packet data and the storage of the transmitted packet data are performed by the transmitter 10, this may be performed in the controller 30. That is, the packet data generator 100 and the transmitted packet storage 104 may be included in the controller 30. Likewise, the PHY header analyzer 200, the likelihood synthesizer 201, the decoder 202, and the received packet storage 204 included in the receiver 20 may also be included in the controller 30. In addition, the controller 30 may be a control circuit configured using an analog or digital circuit and these functions may be included in the control circuit.

The radio 40 converts the packet data from the transmitter 10 into a radio wave, transmits the radio wave, converts packet data externally received as a radio wave into a signal, and outputs the signal to the receiver 20. The radio 40 may include an antenna 41 for transmitting and receiving the radio wave. The antenna 41 may be a chip antenna, may be an antenna formed by using a wiring line on a printed circuit board, or may be an antenna formed by using a linear conductor element.

Figure 3:
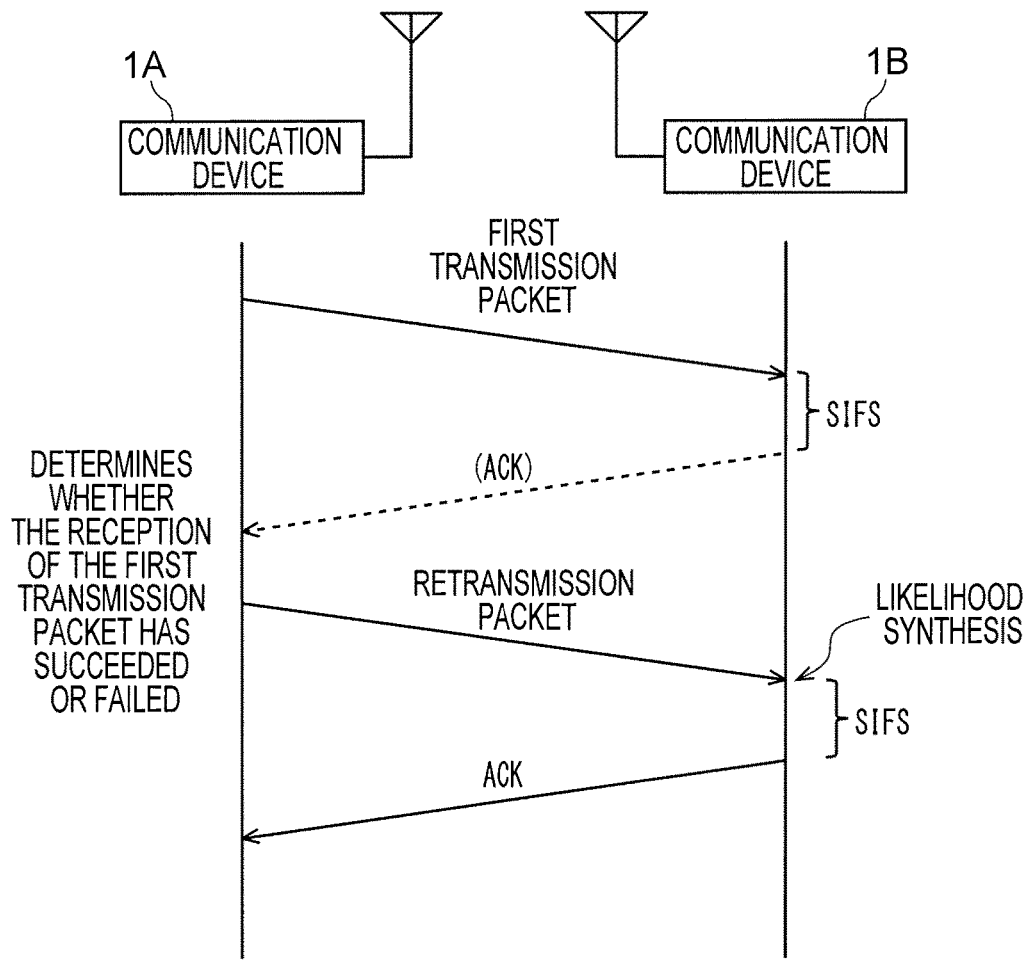
FIG. 3 is a diagram showing an outline of wireless communication of HARQ.

FIG. 3 is a diagram showing an outline of wireless communication using HARQ between a wireless communication device 1A of the transmission side and a wireless communication device 1B of the reception side. A straight line under each of the wireless communication devices 1A and 1B shows a flow of a time and shows that the time passes from the upper side to the lower side of the drawing. Hereinafter, the wireless communication device 1 of the transmission side and elements thereof are denoted by a reference letter A and the wireless communication device 1 of the reception side and elements thereof are denoted by a reference letter B, unless otherwise specified.

First, the wireless communication device 1A transmits packet data, which is the first transmission packet, from the transmitter 10A to the wireless communication device 1B. The transmission of the packet is not limited to being transmitted from the wireless communication device 1A to the wireless communication device 1B with directivity and the wireless communication device 1A may transmit the packet data by broadcasting.

The wireless communication device 1B receives the first transmission packet by the receiver 20B and executes the decoding processing of the first transmission packet. Whether or not the packet is the first transmission packet is read from data recorded in the PHY header 500, for example.

When there is no decoding error in the decoding processing, the wireless communication device 1B transmits the ACK packet to the wireless communication device 1A via the transmitter 10B. When there is a decoding error, the ACK packet is not returned or the NACK packet not shown in the drawing is transmitted. Similar to the transmission of the packet of the wireless communication device 1A, the wireless communication device 1B may transmit the ACK/NACK packet with directivity and may transmit the ACK/NACK packet by broadcasting. As described above, when the ACK/NACK packet is transmitted, the wireless communication device 1B transmits the ACK/NACK packet within the SIFS time.

In addition, when the decoding error occurs, the wireless communication device 1B stores the likelihood of the payload 650 in the received packet storage 204, in addition to the above correspondence. As another example, the data of the payload 650 may be stored in the received packet storage 204.

The wireless communication device 1A determines whether the reception of the first transmission packet has succeeded or failed in the wireless communication device 1B, on the basis of a reception state of the ACK/NACK packet from the wireless communication device 1B received by the ACK/NACK receiver 203A. When it is determined that the reception of the first transmission packet has succeeded in the wireless communication device 1B, the wireless communication device 1A ends the processing regarding the transmitted first transmission packet and proceeds to processing such as transmission and reception of a next packet.

On the other hand, when it is determined that the reception of the first transmission packet has failed in the wireless communication device 1B, the wireless communication device 1A transmits the retransmission packet. This retransmission packet is transmitted with data showing the retransmission packet and a redundant packet for the retransmission packet in the transmitter 10A of the wireless communication device 1A. Like the first transmission packet, the packet data is generated by the packet data generator 100. The wireless communication device 1A may include a generator for generating the packet data in each of the first transmission packet and the retransmission packet as a separate generator.

After receiving the retransmission packet, the wireless communication device 1B decodes the PHY header 500 or the MAC header 600 included in the retransmission packet and determines whether the received packet is the first transmission packet or the retransmission packet.

When it is determined that the received packet is the retransmission packet, the wireless communication device 1B executes the decoding processing in the decoder 202B after performing the likelihood synthesis in the likelihood synthesizer 201B. If it is determined that the quality of the received signal has been improved by the likelihood synthesis in the likelihood synthesizer 201B and the decoding error in the retransmission packet has been eliminated, after the SIFS time has passed from the end of the reception of the retransmission packet, the ACK packet is transmitted from the ACK/NACK transmitter 103B.

In the processing of HARQ, when the retransmission packet is received, it becomes important to determine that "the received packet is not the first transmission packet but the retransmission packet" at the side of the wireless communication device 1B. If this determination is incorrect, it becomes difficult to perform appropriate likelihood synthesis and decoding processing. The wireless communication device 1B decodes the PHY header 500 and the MAC header 600, acquires necessary information, and determines whether or not the received packet is the retransmission packet.

Examples of the information necessary for determining whether or not the received packet is the retransmission data to the own device include destination ID information and a retransmission flag. In addition, in the case of a communication system including a portion in which a packet signal is scrambled, information of a scrambling initial value is also necessary. In the wireless LAN, transmission in which the scrambling initial value has been changed for each packet is allowed. Therefore, even if original data transmitted in the first transmission packet and the retransmission packet are the same, data sequences of actually received signals may be scrambled to different sequences. To execute the likelihood synthesis in the wireless communication device 1B of the receiver side, it is necessary to execute descrambling processing for restoring the scrambled sequence to the original sequence. For this reason, information of the scrambling initial value is necessary.

As described above, in reception processing of HARQ, because the wireless communication device 1B of the reception side determines whether or not the received packet is the retransmission packet, on the basis of the destination ID information or the retransmission flag, a delay occurs due to this processing. For this reason, the reception processing in the case of using HARQ has a larger processing delay than the reception processing in the case of not using HARQ. If the processing delay increases, it becomes difficult to generate the ACK packet within the SIFS time and normal wireless packet communication cannot be performed. To reduce the processing delay, it is important to quickly execute the processing for determining whether or not the received packet is the retransmission packet in the wireless communication device 1B of the reception side, thereby securing a time for advance preparation for the likelihood synthesis.

Figure 4:
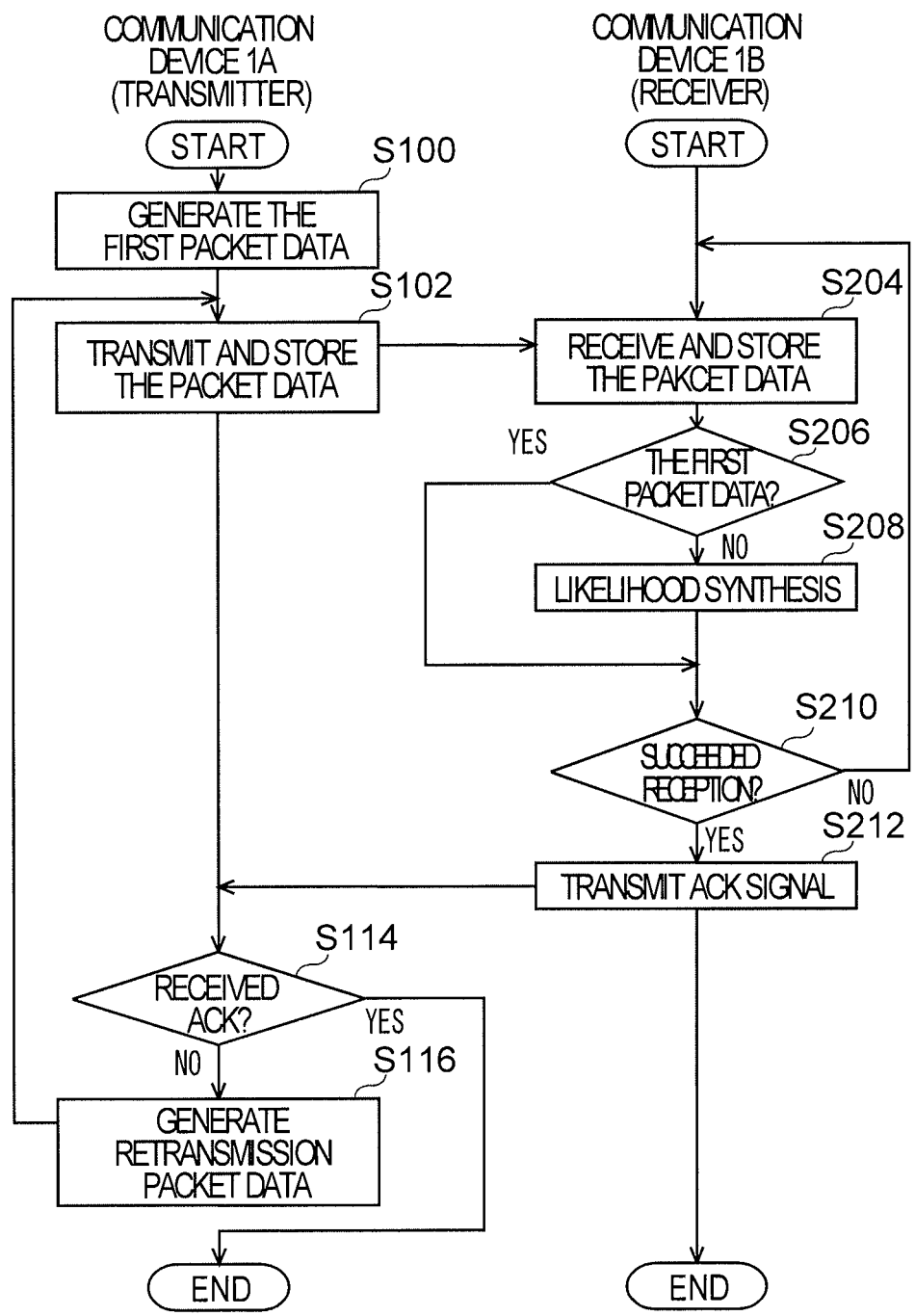
FIG. 4 is a flowchart illustrating processing of a wireless communication device.

Processing of HARQ from the transmission of the first transmission packet to the reception of the retransmission packet will be described using a flowchart. FIG. 4 is a flowchart illustrating processing of the wireless communication device 1A of the transmission side and the wireless communication device 1B of the reception side in the case where certain packet data is transmitted. Although one packet data is described in FIG. 4, the present invention is not limited thereto and the wireless communication devices 1A and 1B may constantly perform interrupt processing between other wireless communication device 1 and the wireless communication devices 1A and 1B.

First, the packet data generator 100A of the wireless communication device 1A generates packet data regarding the first transmission packet (S100). The packet data is generated by performing encoding including scrambling of the payload 650.

Next, the transmitter 10A of the wireless communication device 1A transmits the generated packet data via the radio 40A (S102). At this timing, the transmitted packet data is stored in the transmitted packet storage 104A.

Next, the receiver 20B of the wireless communication device 1B receives the packet transmitted from the wireless communication device 1A via the radio 40B (S204). Because the wireless communication device 1 is not limited to one-to-one communication, the wireless communication device 1 recognizes that a transmission source of the received data is the wireless communication device 1A, from the information of the MAC header 600.

Next, the PHY header analyzer 200B of the wireless communication device 1B determines whether or not the received packet data is the first transmission packet (S206).

When the received packet data is the first transmission packet (S206: YES), the reception is continuously performed and it is determined whether or not the reception has succeeded (S210). When the received packet data is not the first transmission packet, that is, the received packet data is the retransmission packet (S206: NO), the likelihood synthesizer 201B of the wireless communication device 1B performs the likelihood synthesis in the retransmission packet (S208) and determines whether or not the reception has succeeded (S210).

When the reception has succeeded (S210: YES), the ACK/NACK transmitter 103 of the wireless communication device 1B transmits the ACK packet (S212). When the reception has failed (S210: NO), the wireless communication device 1B proceeds to a reception waiting state. In the case where the NACK transmission is performed instead of the ACK transmission, when the reception has succeeded, the wireless communication device 1B ends the processing and when the reception has failed, the wireless communication device 1B proceeds to the reception waiting state after transmitting the NACK packet.

When the ACK packet from the wireless communication device 1B is received by the ACK/NACK receiver 203A (S114: YES), the wireless communication device 1A determines that the transmission processing has ended normally and ends the processing.

On the other hand, after a predetermined time, for example, a time sufficiently longer than the SIFS time passes from the transmission of the packet, when the ACK packet has not been received (S114: NO), the wireless communication device 1A determines that the transmission of the packet has failed and generates the retransmission packet in the packet data generator 100 (S116). In addition, the processing is repeated from the packet transmission processing (S102).

In the following description of embodiments, embedding of identification information on whether the packet is the first transmission packet or the retransmission packet will be described.

(First Embodiment)

A wireless communication device 1 according to this embodiment stores information necessary for HARQ processing in a PHY header 500 to be a head of a packet. When packet data is received, the wireless communication device 1 quickly executes processing for determining whether or not the packet data is a retransmission packet, quickens timing of preprocessing for performing likelihood synthesis, and performs the likelihood synthesis within an SIFS time.

Figure 5A:
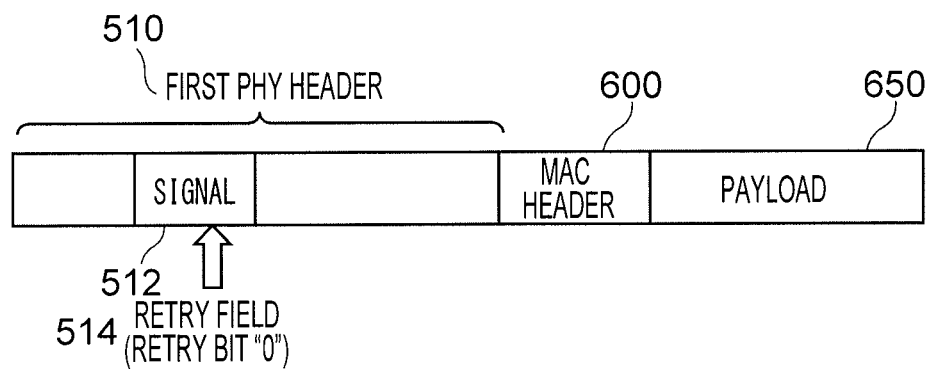
FIGS. 5A and 5B are diagrams showing a data structure of packet data according to an embodiment.
Figure 5B:
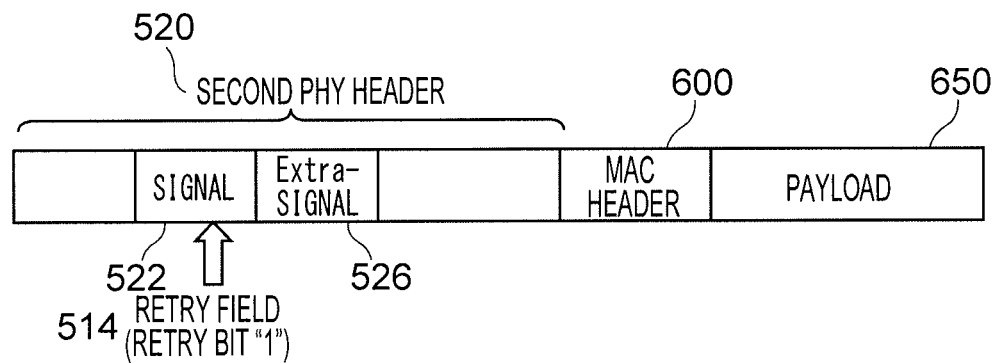

FIGS. 5A and 5B are diagrams showing a place where a flag to be the retransmission packet according to this embodiment is stored. FIG. 5A is a diagram showing a data structure in a first transmission packet and FIG. 5B is a diagram showing a data structure in the retransmission packet including the retransmission flag. In the drawings of the data structures, a ratio of data lengths does not represent a ratio of actual data lengths. As can be known by comparing these drawings, in this embodiment, the first transmission packet and the retransmission packet have different frame configurations.

As shown in FIG. 5A, the first transmission packet includes a first PHY header 510, a MAC header 600, and a payload 650. In addition to information included in a general PHY header, a retry field is included in the first PHY header 510. For example, a retry field 514 is included in a first signal field 512 in the first PHY header 510.

The retry field 514 may have at least 1 bit. For example, when the retry field 514 has 1 bit, a value of the retry field 514 is determined as 0 in the case of the first transmission packet and is determined as 1 in the case of the retransmission packet. Setting of the value of the retry field 514 is executed by a PHY header generator 101A of a wireless communication device 1A of the transmission side. An encoder 102A encodes the packet data including the information and generates the packet data. The retry field may be included in a non-used place in the PHY header. The retry field uses a bit or a field not used for specific purposes in the standard, for example.

In a PHY header analyzer 200B of a wireless communication device 1B of the reception side, it can be determined whether the received packet is the first transmission packet or the retransmission packet, by referring to the value of the retry field 514.

As shown in FIG. 5B, the retransmission packet includes a second PHY header 520, a MAC header 600, and a payload 650. In addition to the information included in the general PHY header, a retry field 524 and an extension signal field 526 are included in the second PHY header 520. Similar to the case of the first transmission packet, the retry field 524 is included in a second signal field 522 of the second PHY header 520 and a value showing whether the packet is the first transmission packet or the retransmission packet is stored.

In the PHY header analyzer 200B of the wireless communication device 1B of the reception side, when it is determined that the received packet is the retransmission packet, by referring to the value of the retry field 514, the likelihood synthesis of the received packet is executed by a likelihood synthesizer 201B.

Data necessary for the likelihood synthesis is stored in the extension signal field 526. In the extension signal field 526, for example, an identifier (ID) information of a packet or information (hereinafter, referred to as HARQ information)

of a scrambling initial value is stored as information necessary for HARQ. By adopting such a configuration, in the reception processing, the HARQ information can be acquired at timing earlier than that in the case of storing the information in the payload 650 or in the MAC header 600.

Setting of a value of the extension signal field 526 is also executed by the PHY header generator 101A and the encoder 102A in the wireless communication device 1A of the transmission side, similar to the retry field. As such, the extension signal field 526 is provided, so that an information amount of the retransmission packet is larger than an information amount of the first transmission packet, that is, a data length of the second PHY header 520 is larger than a data length of the first PHY header 510.

Figure 6:
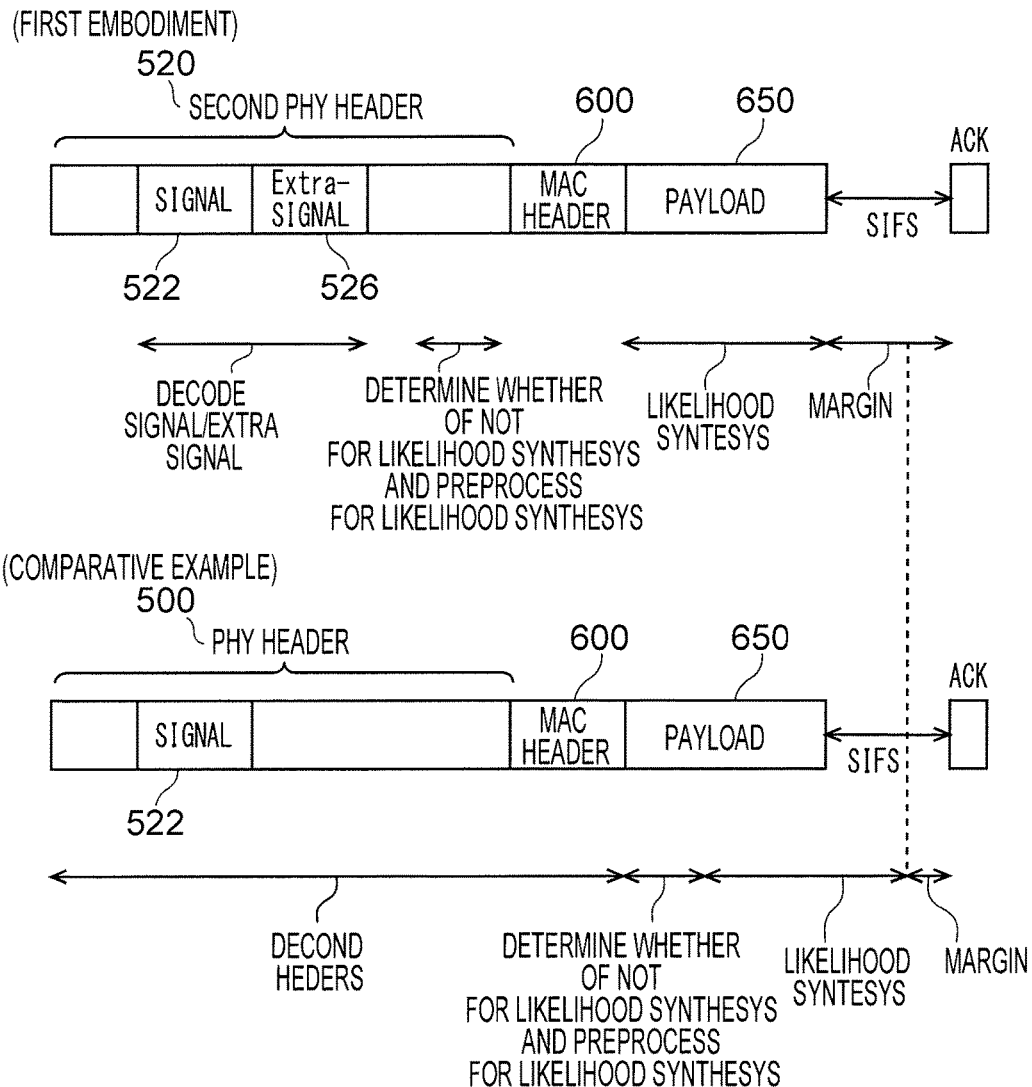
FIG. 6 is a schematic diagram showing a processing time of a retransmission packet according to an embodiment.

FIG. 6 is a diagram showing an outline of a processing time of each field in decoding processing of the retransmission packet. In the individual drawings of this embodiment and a comparative example, an upper part shows reception of packet data and lower arrows show processing times in a PHY header analyzer 200, a likelihood synthesizer 201, and a decoder 202.

In the wireless communication device 1 according to this embodiment, decoding of the second signal field 522 and the extension signal field 526 in the second PHY header 520 starts from reception timing of the field. A decoding time of the fields ends almost at the same time as reception timing of the extension signal field. Thereafter, processing for determining whether or not to perform the likelihood synthesis of the payload 650 and preprocessing for performing the likelihood synthesis are executed.

That is, it is determined whether the packet is the retransmission packet or the first transmission packet, by reading the value of the retry field in the signal field in the packet data. Next, when it is determined that the packet is the retransmission packet, information such as a packet ID and a scrambling initial value is read from the decoded extension signal field data. In addition, if a destination ID is stored in the extension signal field 526, in the case where the received packet data is not data to be transmitted to the own wireless communication device, reception can be stopped.

If reception of the payload starts, at this timing, the likelihood synthesis of the retransmission packet starts on the basis of the data of the payload of the first transmission packet stored in the received packet storage 204. The likelihood synthesis can be performed almost in real time with the reception of the payload. In addition, decoding processing of the payload may be executed in parallel with the likelihood synthesis.

After the reception ends and the likelihood synthesis ends, as shown in the drawing, the SIFS time until an ACK packet is transmitted is almost the same as the margin and the wireless communication device 1 can transmit the ACK packet with the margin within the SIFS time. For example, when the likelihood synthesis normally ends, other processing such as processing of a part of the payload of which the decoding processing has not been completed can be quickly advanced in the time of the margin.

On the other hand, in the comparative example, the determination on whether the packet is the first transmission packet or the retransmission packet is stored in the MAC header 600. In this case, it is unknown whether the packet is the first transmission packet or the retransmission packet until decoding of the MAC header 600 ends, that is, until at least the reception of the MAC header 600 ends. As a result, the determination of the likelihood synthesis of the payload and the preprocessing cannot be performed until at least the reception of the MAC header 600 ends. The time of the determination of the likelihood synthesis and the preprocessing is delayed as compared with the wireless communication device 1 according to this embodiment, so that the time at which the likelihood synthesis ends is shifted by a delay amount. As a result, the margin until the ACK packet is transmitted after the likelihood synthesis ends is short as compared with the wireless communication device 1 according to this embodiment.

As described above, in the wireless communication device 1 according to this embodiment, the margin until the ACK packet is transmitted after the reception of the packet data ends is greatly taken as compared with the comparative example. Therefore, for example, the possibility that the processing delay regarding the likelihood synthesis occurs can be decreased.

As described above, according to this embodiment, the retry field and the necessary information are stored in the second PHY header 520 of the retransmission packet and the information necessary for HARQ is stored by the information amount larger than the information amount of the first PHY header 510, so that it is possible to suppress the overhead of the preprocessing for the likelihood synthesis and to perform the likelihood synthesis at timing earlier than that of the conventional case. Further, the data necessary for the case of the retransmission is included in the PHY header of the retransmission packet without changing the information amount of the PHY header of the first transmission packet, so that it is possible to perform the communication without degrading communication efficiency of packets not to be the retransmission packet. As such, suppression of the processing delay for the likelihood synthesis and securing of the communication efficiency in the first transmission packet are implemented, so that the overhead associated with the implementation of HARQ can be suppressed. That is, an increase in the information amount of the PHY header (degradation of the communication efficiency) in the first transmission packet can be suppressed and the likelihood synthesis can be efficiently executed in the retransmission packet.

As a result, both improvement of the reception performance by HARQ and a reliable ACK response can be realized. In addition, if the processing time is long, a memory area for temporarily holding the data during decoding is separately necessary. However, according to this embodiment, an effect of reducing a memory amount can be expected. In addition, in an early step of the reception processing, the information showing whether or not the packet is the retransmission packet is stored and the destination ID is stored in the PHY header of the retransmission packet, so that the destination ID information can be acquired. Therefore, for example, in the case of the packet not to be transmitted to the own wireless communication device, the reception processing can be stopped and an effect of reducing power consumption by omitting unnecessary decoding processing can be obtained.

(Second Embodiment)

In the first embodiment described above, a retry field is provided in a PHY header, so that it is determined whether received packet data relates to a first transmission packet or a retransmission packet. However, in this embodiment, modulation methods of the first transmission packet and the retransmission packet are set to different modulation methods, so that it is determined whether the received packet data relates to the first transmission packet or the retransmission packet.

Figure 7A:
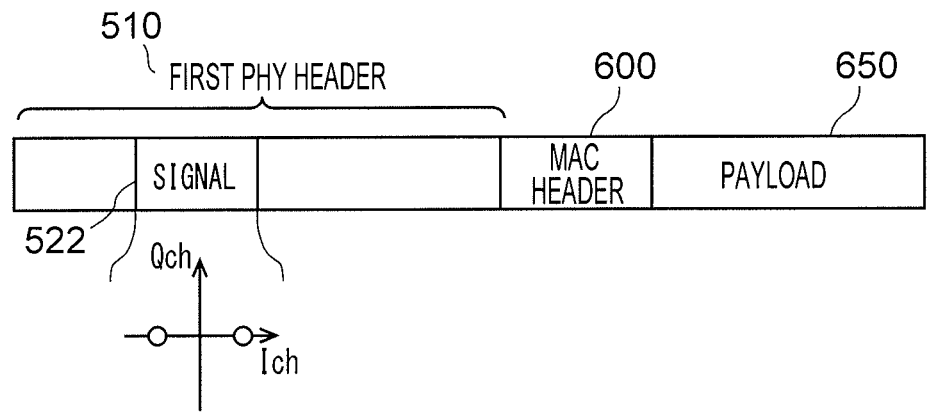
FIGS. 7A and 7B are diagrams illustrating a method of modulating a PHY header according to an embodiment.
Figure 7B:
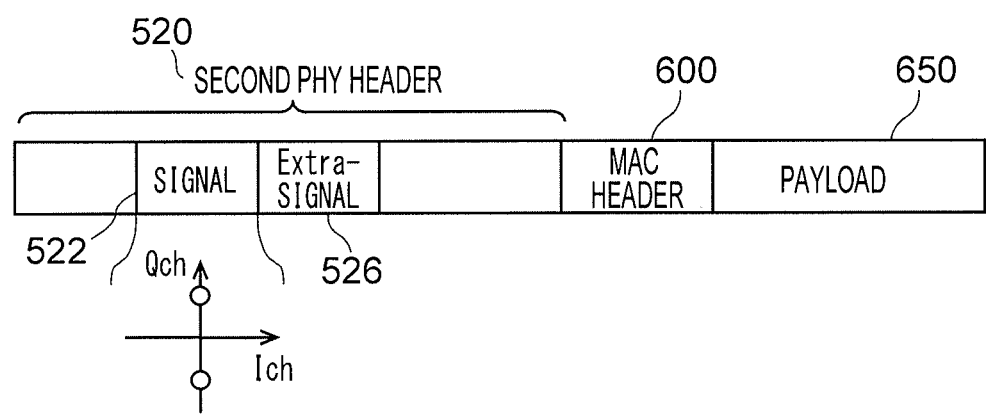

FIGS. 7A and 7B are diagrams showing a part of a configuration of packet data according to this embodiment.

FIG. 7A is a diagram showing the first transmission packet and FIG. 7B is a diagram showing the retransmission packet.

As shown in FIG. 7A, in the first transmission packet, a first signal field 512 of a first PHY header 510 is modulated by a first modulation method, for example, binary phase shift keying (BPSK). BPSK is one of methods of transmitting data by modulating a phase of a reference signal and transmits bit data by modulating the phase in a 0° and 180° direction to be an I channel direction. A white circle in the drawings is a phase showing a value of a bit. For example, 0° (a positive side of an I channel) shows 0 bit and 180° (a negative side of the I channel) shows 1 bit.

On the other hand, as shown in FIG. 7B, in the retransmission packet, a second signal field 522 of a second PHY header 520 is modulated by a second modulation method different from the first modulation method, for example, QBPSK (Quadrature-BPSK). QBPSK transmits bit data by modulating a phase shifted by 90° from the BPSK, that is, modulating the phase in a 90° and 270° direction to be a Q channel direction.

A packet data generator 100A of a wireless communication device 1A of the transmission side adopts a different method as the modulation method of the signal field to be the part of the PHY header, as described above. In this way, different from the first embodiment, packet data is generated so that the first transmission packet and the retransmission packet can be distinguished without providing a retry field.

On the other hand, a PHY header analyzer 200B of a wireless communication device 1B of the reception side determines whether the packet data is the first transmission packet or the retransmission packet, by the modulation method of the signal field in the received packet data.

As described above, according to this embodiment, the modulation method of the signal field of the PHY header is set differently in the first transmission packet and the retransmission packet, so that an implementation is enabled in a state in which the first transmission packet and the retransmission packet can be distinguished without providing the retry field. In this way, an information amount of the PHY header can be reduced and surplus information is reduced. Therefore, communication efficiency can be improved.

In the above description, the modulation method of the signal field is set differently. However, the present invention is not limited thereto. For example, a modulation method of all of the PHY header may be set differently or a modulation method of a portion to an extension signal field of the retransmission packet may be used. Furthermore, a modulation method of a predetermined other field in the PHY header may be set differently and it may be determined whether the packet is the first transmission packet or the retransmission packet, by the modulation method of other field.

In addition, the modulation method is BPSK/QBPSK. However, the present invention is not limited thereto. Any two modulation methods that can clearly distinguish the packets and are used in wireless communication may be selected. In particular, when BPSK/QBPSK is used, a amplitude direction is different by 90°, so there it is possible to clearly distinguish the two packets.

(Third Embodiment)

In the embodiments described above, the case where frame aggregation is not performed and only one MAC frame is provided for each PHY header has been described. However, the present invention is not limited thereto. That is, the embodiments can be applied to packet data including a plurality of MAC frames.

Figure 8A:
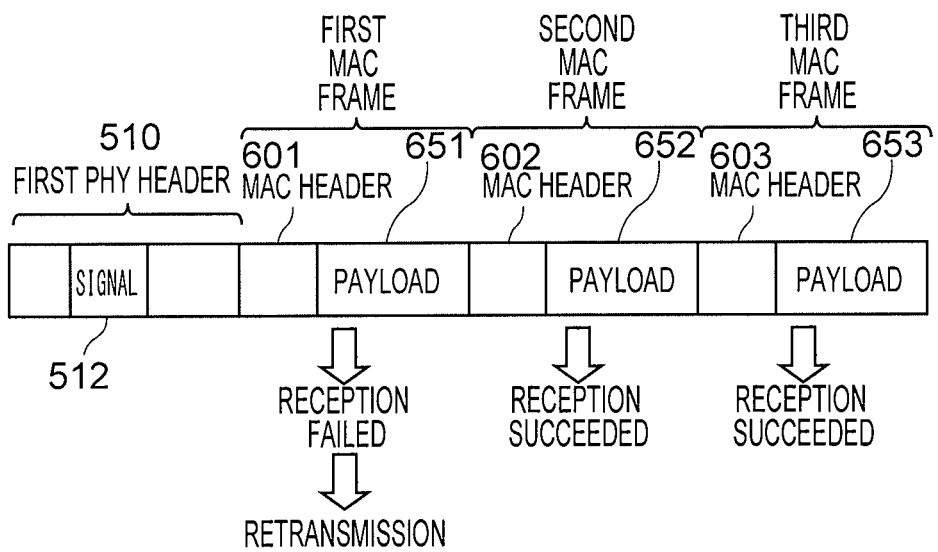
FIGS. 8A and 8B are diagrams showing frame aggregated packet data according to an embodiment.
Figure 8B:
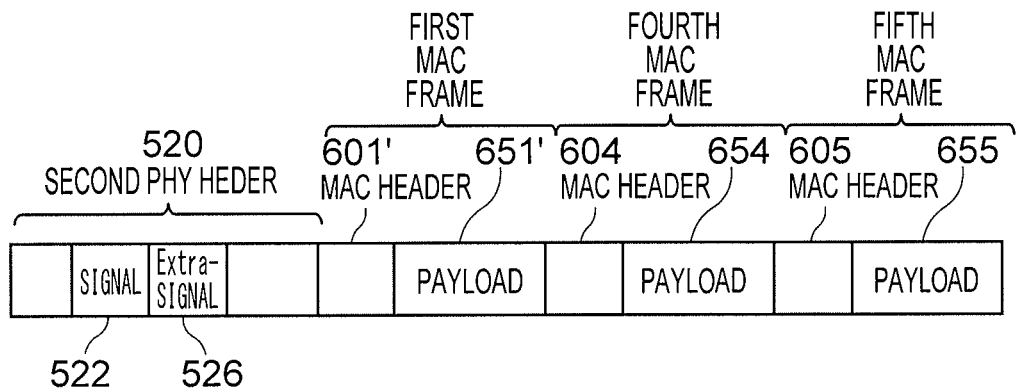

FIGS. 8A and 8B are diagrams showing a configuration of packet data where frames are aggregated. For example, in FIGS. 8A and 8B, data obtained by aggregating three MAC frames is used as packet data for communication. In wireless packet communication, as described above, one packet may be configured from a data unit called a plurality of MAC frames.

FIG. 8A is a diagram showing an example of a configuration of a first transmission packet including three MAC frames. The first transmission packet includes a first PHY header 510, a MAC header 601 and a payload 651 configuring a first MAC frame, a MAC header 602 and a payload 652 configuring a second MAC frame, and a MAC header 603 and a payload 653 configuring a third MAC frame. Although not shown in the drawings, each MAC frame may include a redundant bit for error detection.

A wireless communication device 1A of the transmission side transmits frame aggregated packet data via a radio 40A. A wireless communication device 1B of the reception side that has received the packet data executes decoding processing on each MAC frame and determines whether or not reception has succeeded. For example, it is assumed that the reception of the first MAC frame has failed and the reception of the second MAC frame and the third MAC frame has succeeded. In this case, an ACK/NACK transmitter 103B of the wireless communication device 1B of the reception side transmits ACK showing whether or not the reception has succeeded with respect to each MAC frame.

For ACK, separate AKC may be transmitted for each frame or block ACK adopted in IEEE802.11n may be transmitted to reduce an overhead. The block ACK is used for replying to radio frames of a maximum of 64 KB at a time with one ACK. In the block ACK, a bit showing a reception status is issued for each MAC frame and it is notified whether or not the reception has succeeded, for each frame.

An ACK/NACK receiver 203A of the wireless communication device 1A acquires a frame number (SN: Sequence Number) of the MAC frame which the wireless communication device 1B has failed to receive, by receiving the block ACK.

For example, as shown in FIG. 8A, when the reception of only the first MAC frame has failed, the wireless communication device 1A receives the ACK information transmitted from the wireless communication device 1B, thereby acquiring information showing that the reception of the first MAC frame has failed and the reception of the second MAC frame and the third MAC frame has succeeded. The wireless communication device 1A determines to retransmit the first MAC frame among the first to third MAC frames, on the basis of a reception result of ACK.

The wireless communication device 1A aggregates the first MAC frame to be retransmitted and a fourth MAC frame and a fifth MAC frame to be newly transmitted and generates and transmits packet data. FIG. 8B is a diagram showing an example of generated packet data including a MAC frame to be retransmitted. When the MAC frame to be retransmitted is included, packet data having a second PHY header 520 including an extension signal field 526 as a PHY header is generated.

In this embodiment, information showing the MAC frame is stored in the extension signal field 526. For example, the information showing the MAC frame is information showing which frame among the aggregated frames is the retransmission packet and is information such as a frame size, frame order, and SN. The information may be other combination information and may be information showing where the retransmission packet for any frame with respect to the first transmission packet is stored in the generated packet data.

It is assumed that the information is, for example, information such as the frame size, the frame order, and the SN. In this case, a PHY header analyzer 200B of the wireless communication device 1B determines what number of frame the retransmission packet is from the frame order and the corresponding SN. In addition, it is determined which region of the received packet data is the retransmission packet, from the frame size of each frame.

FIG. 8B is a diagram showing a configuration example of packet data including the retransmission packet in which the MAC frames are aggregated. In the extension signal field 526, the size of each MAC frame, the order in which MAC frames are stored, and SN are stored. For example, the retransmission packet is the first MAC frame (a MAC header 601' and a payload 651') and is stored first among the aggregated MAC frames and a fourth MAC frame (a MAC header 604 and a payload 654) and a fifth MAC frame (a MAC header 605 and a payload 655) to be a new first transmission packet are stored in the following MAC frames.

In this embodiment, because information showing whether or not the packet is the retransmission packet is stored in the second PHY header 520, the information does not need to be stored in each MAC header. Therefore, the MAC header 601' of the first MAC frame to be the retransmission packet may have the same content as the MAC header 601 of the first transmission. On the other hand, the payload 651' may be the same as the payload 651 when an HARQ method is a CC method and may be different from the payload 651 when the HARQ method is an IR method.

In this case, the reception side determines that the retransmission packet is the first frame among the aggregated MAC frames, which is the first MAC frame, and the retransmission packet includes the size of the first frame among the frame sizes. After the above determination, a likelihood synthesizer 201 of the wireless communication device 1B executes likelihood synthesis of the first MAC frame. That is, the likelihood synthesis of the payload 651' is executed. The processing after it is determined that the packet is the retransmission packet may be executed on the basis of the processing described in the first embodiment.

In addition, it is determined whether or not reception of the first MAC frame has succeeded. Next, for the fourth MAC frame and the fifth MAC frame, it is determined whether or not reception of the frame as the first transmission packet has succeeded and ACK (block ACK) is appropriately transmitted.

As such, even when the MAC frames are aggregated, information of the MAC frame of which reception has failed among the aggregated MAC frames is appropriately transmitted and received. The information of the MAC frame of which the reception has failed is stored in the PHY header in the packet data including the retransmission packet. The reception side can determine where the retransmission packet is stored in the received packet data by analyzing the information of the PHY header and can appropriately execute an operation for the retransmission packet such as the likelihood synthesis.

As described above, according to this embodiment, for the aggregated MAC frames, the information of the frame of which the reception has failed can be appropriately transmitted and received. In this case, because the information on the retransmission frame is stored not in the MAC header of each MAC frame but in the PHY header of the frame aggregated packet data, a problem of a processing delay when HARQ is performed can be avoided. By storing the information on the frame aggregation such as the frame size, the frame order, and SN in the PHY header, it is possible to determine which frame is likelihood synthesized in an early step at the time of reception. Therefore, the processing delay of the likelihood synthesis can be reduced.

(Fourth Embodiment)

In the embodiments described above, an HARQ method is executed by the same communication method in a first transmission packet and a retransmission packet. This embodiment is not limited thereto and is configured to cope with the case where the HARQ method is changed in each of the first transmission packet and the retransmission packet.

As described above, in the HARQ method, there are two methods of a CC method and an IR method as methods of transmitting the retransmission packet. A difference in these methods appears as a difference in processing methods of likelihood synthesis when the retransmission packet is received. That is, when the method is changed at timing at which the retransmission packet is received, the likelihood synthesis may not be appropriately performed. Therefore, in this embodiment, information on these methods is stored in a PHY header.

For example, as shown in FIG. 5, in the embodiment described above, a retry field is provided in a PHY header of packet data and it is determined whether a packet is the first transmission packet or the retransmission packet. In this embodiment, information showing the HARQ method is stored in a signal field of the PHY header.

As the HARQ method, the CC method and the IR method are known. However, other methods may be used. When the CC method and the IR method are used, only the CC method, only the IR method, and a CC-IR method can be applied. In this case, for example, a region of two bits showing methods is provided in the PHY header and the CC method is shown by 0, the IR method is shown by 1, and the CC-IR method is shown by 2. However, the present invention is not limited thereto and the HARQ method may be shown by a bit flag. In this case, for example, the CC method is shown by 1, the IR method is shown by 2, and the CC-IR method is shown by 3. In addition, the number of bits does not need to be two bits and a bit for redundancy may be added.

A packet data generator 100A of a wireless communication device 1A of the transmission side generates a PHY header including bit information and a PHY header analyzer 200B of a wireless communication device 1B of the reception side determines the HARQ method from the bit information. In addition, a likelihood synthesizer 201B performs likelihood synthesis on the basis of a determination result and reliability of communication is improved.

In addition, in the case of the IR method, because a redundant signal is retransmitted, information of an encoding rate of the redundant signal or information of a puncture bit may be stored. A configuration that does not have a retry field showing whether the packet is the first transmission packet or the retransmission packet, described using FIG. 5, may be realized by changing a modulation method of a part of the PHY header, as shown in FIG. 7.

As described above, according to this embodiment, even when the HARQ method is changed in the first transmission packet and the retransmission packet, appropriate likelihood synthesis processing of HARQ can be executed at the reception side and an overhead when the likelihood synthesis in the retransmission packet is performed can be suppressed.

Each of the embodiments described above is not limited to HARQ and can be applied to communication in which data is transmitted and likelihood synthesis of the data is performed at the reception side. The communication is not limited to wireless communication and can be used for wired communication. In addition, the communication can be used for communication between modules via a bus in a single device and can be used for communication performed between embedded devices in a system including the embedded devices.

(Fifth Embodiment)

Figure 9:
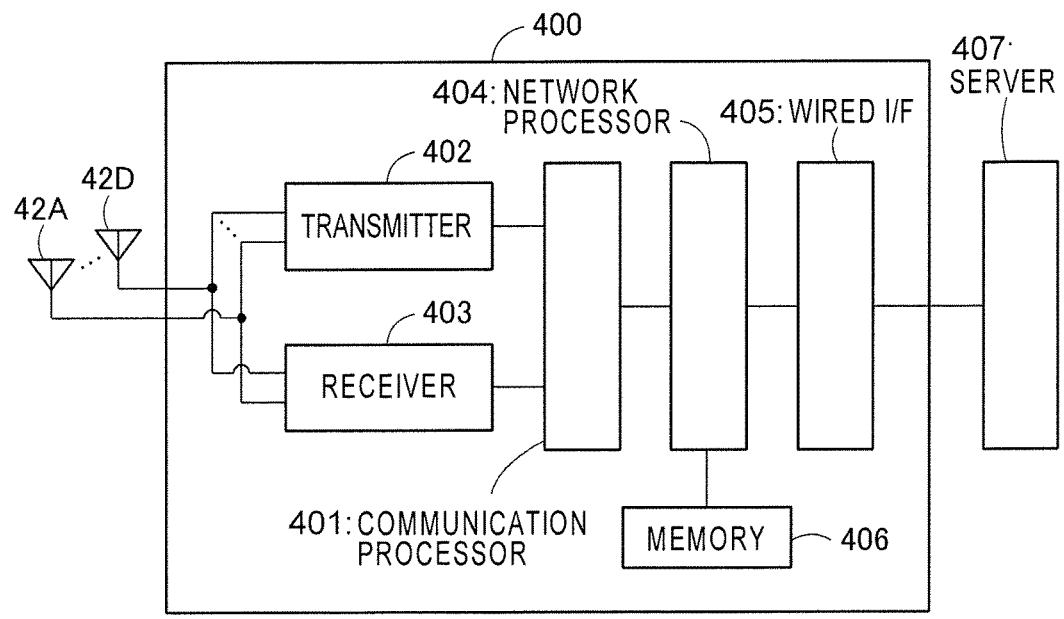
FIG. 9 is a functional block diagram of an access point or a terminal according to an embodiment.

FIG. 9 is a functional block diagram of a base station (access point) 400 according to the embodiment. The access point includes a communication processor 401, a transmitter 402, a receiver 403, antennas 42A, 42B, 42C, and 42D, a network processor 404, a wired I/F 405, and a memory 406. The access point 400 is connected to a server 407 through the wired I/F 405. The communication processor 401 has functions similar to the controller 101 in the first to third embodiments. The transmitter 402 and the receiver 403 have functions similar to the transmitter 102 and the receiver 103 described in the first to third embodiments. The communication processor 404 has functions similar to the upper layer processor in the first to third embodiments. The communication processor 401 may internally possess a buffer for transferring data to and from the network processor 404. The buffer may be a volatile memory, such as an SRAM or a DRAM, or may be a non-volatile memory, such as a NAND or an MRAM.

The network processor 404 controls data exchange with the communication processor 401, data writing and reading to and from the memory 406, and communication with the server 407 through the wired I/F 405. The network processor 404 may execute a higher communication process of the MAC layer, such as TCP/IP or UDP/IP, or a process of the application layer. The operation of the network processor may be performed through processing of software (program) by a processor, such as a CPU. The operation may be performed by hardware or may be performed by both of the software and the hardware.

For example, the communication processor 401 corresponds to a baseband integrated circuit, and the transmitter 402 and the receiver 403 correspond to an RF integrated circuit that transmits and receives frames. The communication processor 401 and the network processor 404 may be formed by one integrated circuit (one chip). Parts that execute processing of digital areas of the transmitter 402 and the receiver 403 and parts that execute processing of analog areas may be formed by different chips. The communication processor 401 may execute a higher communication process of the MAC layer, such as TCP/IP or UDP/IP. Although the number of antennas is four here, it is only necessary that at least one antenna is included.

The memory 406 saves data received from the server 407 and data received by the receiver 402. The memory 406 may be, for example, a volatile memory, such as a DRAM, or may be a non-volatile memory, such as a NAND or an MRAM. The memory 406 may be an SSD, an HDD, an SD card, an eMMC, or the like. The memory 406 may be provided outside of the base station 400.

The wired I/F 405 transmits and receives data to and from the server 407. Although the communication with the server 407 is performed through a wire in the present embodiment, the communication with the server 407 may be performed wirelessly.

The server 407 is a communication device that returns a response including requested data in response to reception of a data forward request for requesting transmission of the data. Examples of the server 407 include an HTTP server (Web server) and an FTP server. However, the server 407 is not limited to these as long as the server 407 has a function of returning the requested data. The server 407 may be a communication device operated by the user, such as a PC or a smartphone. The server 407 may wirelessly communicate with the base station 400.

When the STA belonging to the BSS of the base station 400 issues a forward request of data for the server 407, a packet regarding the data forward request is transmitted to the base station 400. The base station 400 receives the packet through the antennas 42A to 42D. The base station 400 causes the receiver 403 to execute the process of the physical layer and the like and causes the communication processor 401 to execute the process of the MAC layer and the like.

The network processor 404 analyzes the packet received from the communication processor 401. Specifically, the network processor 404 checks the destination IP address, the destination port number, and the like. When the data of the packet is a data forward request such as an HTTP GET request, the network processor 404 checks whether the data requested by the data forward request (for example, data in the URL requested by the HTTP GET request) is cached (stored) in the memory 406. A table associating the URL (or reduced expression of the URL, such as a hash value or an identifier substituting the URL) and the data is stored in the memory 406. The fact that the data is cached in the memory 406 will be expressed that the cache data exists in the memory 406.

When the cache data do not exist in the memory 406, the network processor 404 transmits the data forward request to the server 407 through the wired I/F 405. In other words, the network processor 404 substitutes the STA to transmit the data forward request to the server 407. Specifically, the network processor 404 generates an HTTP request and executes protocol processing, such as adding the TCP/IP header, to transfer the packet to the wired I/F 405. The wired I/F 405 transmits the received packet to the server 407.

The wired I/F 405 receives, from the server 407, a packet that is a response to the data forward request. From the IP header of the packet received through the wired I/F 405, the network processor 404 figures out that the packet is addressed to the STA and transfers the packet to the communication processor 401. The communication processor 401 executes processing of the MAC layer and the like for the packet. The transmitter 402 executes processing of the physical layer and the like and transmits the packet addressed to the STA from the antennas 42A to 42D. The network processor 404 associates the data received from the server 407 with the URL (or reduced expression of the URL) and saves the cache data in the memory 406.

When the cache data exists in the memory 406, the network processor 404 reads the data requested by the data forward request from the memory 406 and transmits the data to the communication processor 401. Specifically, the network processor 404 adds the HTTP header or the like to the data read from the memory 406 and executes protocol processing, such as adding the TCP/IP header, to transmit the packet to the communication processor 401. In this case, the transmitter IP address of the packet is set to the same IP address as the server, and the transmitter port number is also set to the same port number as the server (destination port number of the packet transmitted by the communication terminal), for example. Therefore, it can be viewed from the STA as if communication with the server 407 is established. The communication processor 401 executes processing of the MAC layer and the like for the packet. The transmitter 402 executes processing of the physical layer and the like and transmits the packet addressed to the STA from the antennas 42A to 42D.

According to the operation, frequently accessed data is responded based on the cache data saved in the memory 406, and the traffic between the server 407 and the base station 400 can be reduced. Note that the operation of the network processor 404 is not limited to the operation of the present embodiment. There is no problem in performing other operation when a general caching proxy is used, in which data is acquired from the server 407 in place of the STA, the data is cached in the memory 406, and a response is made from the cache data of the memory 406 for a data forward request of the same data.

The base station (access point) according to the present invention can be applied for the base station in the above-stated any embodiment. The transmission of the frame, the data or the packet used in the any embodiment may be carried out based on the cached data stored in the memory 406. Also, information obtained based on the frame, the data or the packet received by the base station in the first to seventh embodiments may be cached in the memory 406. The frame transmitted by the base station in the first to seventh embodiments may include the cached data or information based on the cached data. The information based on the cached data may include information on a size of the data, a size of a packet required for transmission of the data. The information based on the cached data may include a modulation scheme required for transmission of the data. The information based on the cached data may include information on existence or non-existence of data addressed to the terminal.

The base station (access point) according to the present invention can be applied for the base station in the above-stated any embodiment. In the present embodiment, although the base station with the cache function is described, a terminal (STA) with the cache function can also be realized by the same block configuration as FIG. 9. In this case, the wired I/F 405 may be omitted. The transmission, by the terminal, of the frame, the data or the packet used in the any embodiment may be carried out based on the cached data stored in the memory 406. Also, information obtained based on the frame, the data or the packet received by the terminal in the any embodiment may be cached in the memory 406. The frame transmitted by the terminal in the first embodiment may include the cached data or information based on the cached data. The information based on the cached data may include information on a size of the data, a size of a packet required for transmission of the data. The information based on the cached data may include a modulation scheme required for transmission of the data. The information based on the cached data may include information on existence or non-existence of data addressed to the terminal.

(Sixth Embodiment)

Figure 10:
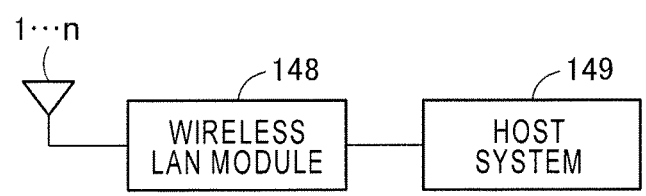
FIG. 10 is a diagram showing an example of an entire configuration of a terminal or an access point according to an embodiment.

FIG. 10 shows an example of entire configuration of a terminal (non-AP terminal) or a base station (AP). The example of configuration is just an example, and the present embodiment is not limited to this. The terminal or the base station includes one or a plurality of antennas 1 to n (n is an integer equal to or greater than 1), a wireless LAN module 148, and a host system 149. The wireless LAN module 148 corresponds to the wireless communication device according to any of the embodiments. The wireless LAN module 148 includes a host interface and is connected to the host system 149 through the host interface. Other than the connection to the host system 149 through the connection cable, the wireless LAN module 148 may be directly connected to the host system 149. The wireless LAN module 148 can be mounted on a substrate by soldering or the like and can be connected to the host system 149 through wiring of the substrate. The host system 149 uses the wireless LAN module 148 and the antennas 1 to n to communicate with external apparatuses according to an arbitrary communication protocol. The communication protocol may include the TCP/IP and a protocol of a layer higher than that. Alternatively, the TCP/IP may be mounted on the wireless LAN module 148, and the host system 149 may execute only a protocol in a layer higher than that. In this case, the configuration of the host system 149 can be simplified. Examples of the present terminal include a mobile terminal, a TV, a digital camera, a wearable device, a tablet, a smartphone, a game device, a network storage device, a monitor, a digital audio player, a Web camera, a video camera, a projector, a navigation system, an external adaptor, an internal adaptor, a set top box, a gateway, a printer server, a mobile access point, a router, an enterprise/service provider access point, a portable device, a hand-held device, a vehicle and so on.

The wireless LAN module 148 (or the wireless communication device) may have functions of other wireless communication standards such as LTE (Long Term Evolution), LTE-Advanced (standards for mobile phones) as well as the IEEE802.11.

Figure 11:
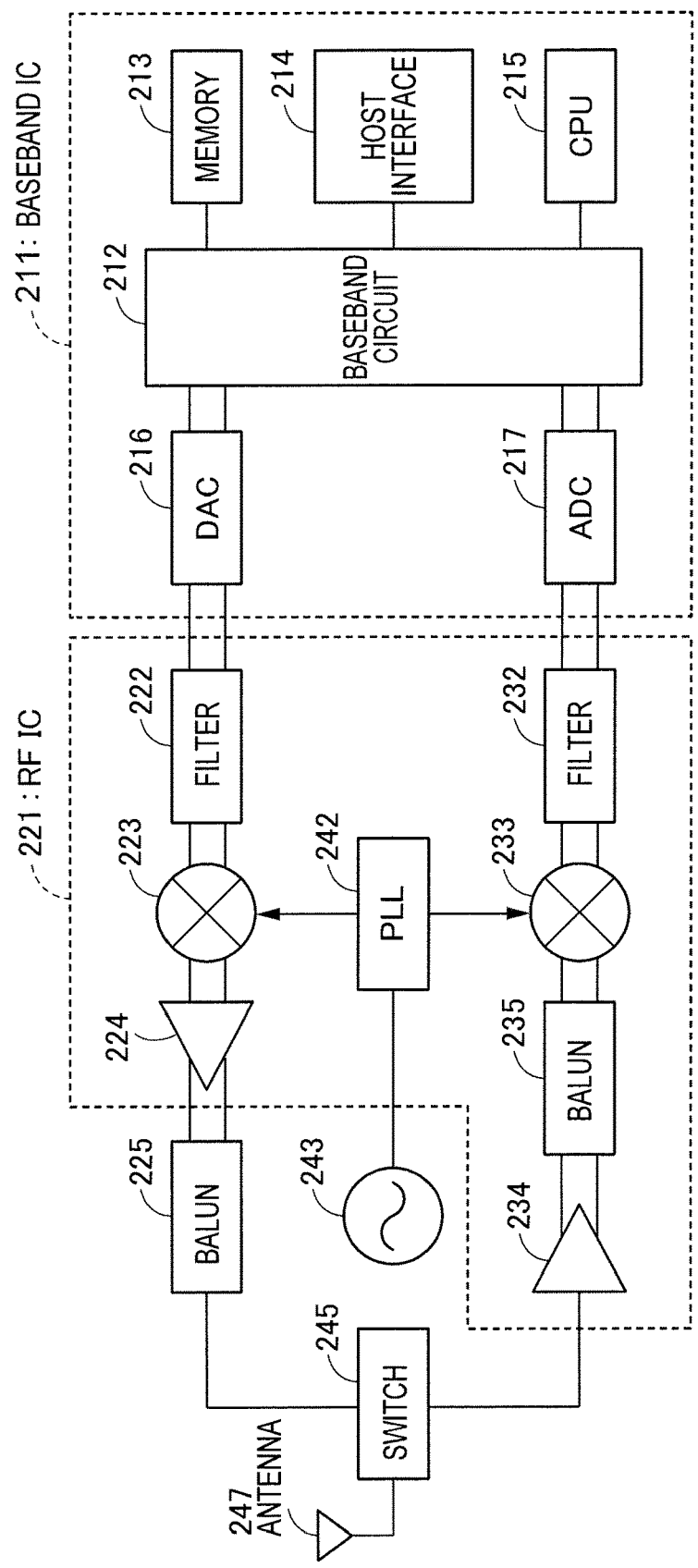
FIG. 11 is a diagram showing a hardware configuration example of a wireless communication device mounted on a terminal or an access point according to an embodiment.

FIG. 11 shows an example of hardware configuration of a WLAN module. The configuration shown in the figure may be applied for each case in where the wireless communication device is mounted in non-AP terminal or in AP (Access Point) provided correspondingly to each function. That is, the configuration can be applied as specific examples for one of the above mentioned wireless communication device. In the configuration shown in figure, at least one antenna is included although a plurality of antennas are included. In this case, a plurality of sets of a transmission system (216 and 222 to 225), a reception system (217, 232 to 235), a PLL 242, a crystal oscillator (reference signal source) 243, and a switch 245 may be arranged according to the antennas, and each set may be connected to a control circuit 212. One or both of the PLL 242 and the crystal oscillator 243 correspond to an oscillator according to the present embodiment.

The wireless LAN module (wireless communication device) includes a baseband IC (Integrated Circuit) 211, an RF (Radio Frequency) IC 221, a balun 225, the switch 245, and the antenna 247.

The baseband IC 211 includes the baseband circuit (control circuit) 212, a memory 213, a host interface 214, a CPU 215, a DAC (Digital to Analog Converter) 216, and an ADC (Analog to Digital Converter) 217.

The baseband IC 211 and the RF IC 221 may be formed on the same substrate. The baseband IC 211 and the RF IC 221 may be formed by one chip. Both or one of the DAC 216 and the ADC 217 may be arranged on the RF IC 221 or may be arranged on another IC. Both or one of the memory 213 and the CPU 215 may be arranged on an IC other than the baseband IC.

The memory 213 stores data to be transferred to and from the host system. The memory 213 also stores one or both of information to be transmitted to the terminal or the base station and information transmitted from the terminal or the base station. The memory 213 may also store a program necessary for the execution of the CPU 215 and may be used as a work area for the CPU 215 to execute the program. The memory 213 may be a volatile memory, such as an SRAM or a DRAM, or may be a non-volatile memory, such as a NAND or an MRAM.

The host interface 214 is an interface for connection to the host system. The interface can be anything, such as UART, SPI, SDIO, USB, or PCI Express.

The CPU 215 is a processor that executes a program to control the baseband circuit 212. The baseband circuit 212 mainly executes a process of the MAC layer and a process of the physical layer. One or both of the baseband circuit 212 and the CPU 215 correspond to the communication control apparatus that controls communication, the controller that controls communication, or controlling circuitry that controls communication.

At least one of the baseband circuit 212 or the CPU 215 may include a clock generator that generates a clock and may manage internal time by the clock generated by the clock generator.

For the process of the physical layer, the baseband circuit 212 performs addition of the physical header, coding, encryption, modulation process (which may include MIMO modulation), and the like of the frame to be transmitted and generates, for example, two types of digital baseband signals (hereinafter, "digital I signal" and "digital Q signal").

The DAC 216 performs DA conversion of signals input from the baseband circuit 212. More specifically, the DAC 216 converts the digital I signal to an analog I signal and converts the digital Q signal to an analog Q signal. Note that a single system signal may be transmitted without performing quadrature modulation. When a plurality of antennas are included, and single system or multi-system transmission signals equivalent to the number of antennas are to be distributed and transmitted, the number of provided DACs and the like may correspond to the number of antennas.

The RF IC 221 is, for example, one or both of an RF analog IC and a high frequency IC. The RF IC 221 includes a filter 222, a mixer 223, a preamplifier (PA) 224, the PLL (Phase Locked Loop) 242, a low noise amplifier (LNA) 234, a balun 235, a mixer 233, and a filter 232. Some of the elements may be arranged on the baseband IC 211 or another IC. The filters 222 and 232 may be bandpass filters or low pass filters.

The filter 222 extracts a signal of a desired band from each of the analog I signal and the analog Q signal input from the DAC 216. The PLL 242 uses an oscillation signal input from the crystal oscillator 243 and performs one or both of division and multiplication of the oscillation signal to thereby generate a signal at a certain frequency synchronized with the phase of the input signal. Note that the PLL 242 includes a VCO (Voltage Controlled Oscillator) and uses the VCO to perform feedback control based on the oscillation signal input from the crystal oscillator 243 to thereby obtain the signal at the certain frequency. The generated signal at the certain frequency is input to the mixer 223 and the mixer 233. The PLL 242 is equivalent to an example of an oscillator that generates a signal at a certain frequency.

The mixer 223 uses the signal at the certain frequency supplied from the PLL 242 to up-convert the analog I signal and the analog Q signal passed through the filter 222 into a radio frequency. The preamplifier (PA) 224 amplifies the analog I signal and the analog Q signal at the radio frequency generated by the mixer 223, up to desired output power. The balun 225 is a converter for converting a balanced signal (differential signal) to an unbalanced signal (single-ended signal). Although the balanced signal is handled by the RF IC 221, the unbalanced signal is handled from the output of the RF IC 221 to the antenna 247. Therefore, the balun 225 performs the signal conversions.

The switch 245 is connected to the balun 225 on the transmission side during the transmission and is connected to the LNA 234 or the RF IC 221 on the reception side during the reception. The baseband IC 211 or the RF IC 221 may control the switch 245. There may be another circuit that controls the switch 245, and the circuit may control the switch 245.

The analog I signal and the analog Q signal at the radio frequency amplified by the preamplifier 224 are subjected to balanced-unbalanced conversion by the balun 225 and are then emitted as radio waves to the space from the antenna 247.

The antenna 247 may be a chip antenna, may be an antenna formed by wiring on a printed circuit board, or may be an antenna formed by using a linear conductive element.

The LNA 234 in the RF IC 221 amplifies a signal received from the antenna 247 through the switch 245 up to a level that allows demodulation, while maintaining the noise low. The balun 235 performs unbalanced-balanced conversion of the signal amplified by the low noise amplifier (LNA) 234. The mixer 233 uses the signal at the certain frequency input from the PLL 242 to down-convert, to a baseband, the reception signal converted to a balanced signal by the balun 235. More specifically, the mixer 233 includes a unit that generates carrier waves shifted by a phase of 90 degrees based on the signal at the certain frequency input from the PLL 242. The mixer 233 uses the carrier waves shifted by a phase of 90 degrees to perform quadrature demodulation of the reception signal converted by the balun 235 and generates an I (In-phase) signal with the same phase as the reception signal and a Q (Quad-phase) signal with the phase delayed by 90 degrees. The filter 232 extracts signals with desired frequency components from the I signal and the Q signal. Gains of the I signal and the Q signal extracted by the filter 232 are adjusted, and the I signal and the Q signal are output from the RF IC 221.

The ADC 217 in the baseband IC 211 performs AD conversion of the input signal from the RF IC 221. More specifically, the ADC 217 converts the I signal to a digital I signal and converts the Q signal to a digital Q signal. Note that a single system signal may be received without performing quadrature demodulation.

When a plurality of antennas are provided, the number of provided ADCs may correspond to the number of antennas. Based on the digital I signal and the digital Q signal, the baseband circuit 212 executes a process of the physical layer and the like, such as demodulation process, error correcting code process, and process of physical header, and obtains a frame. The baseband circuit 212 applies a process of the MAC layer to the frame. Note that the baseband circuit 212 may be configured to execute a process of TCP/IP when the TCP/IP is implemented.

(Seventh Embodiment)

Figure 12:
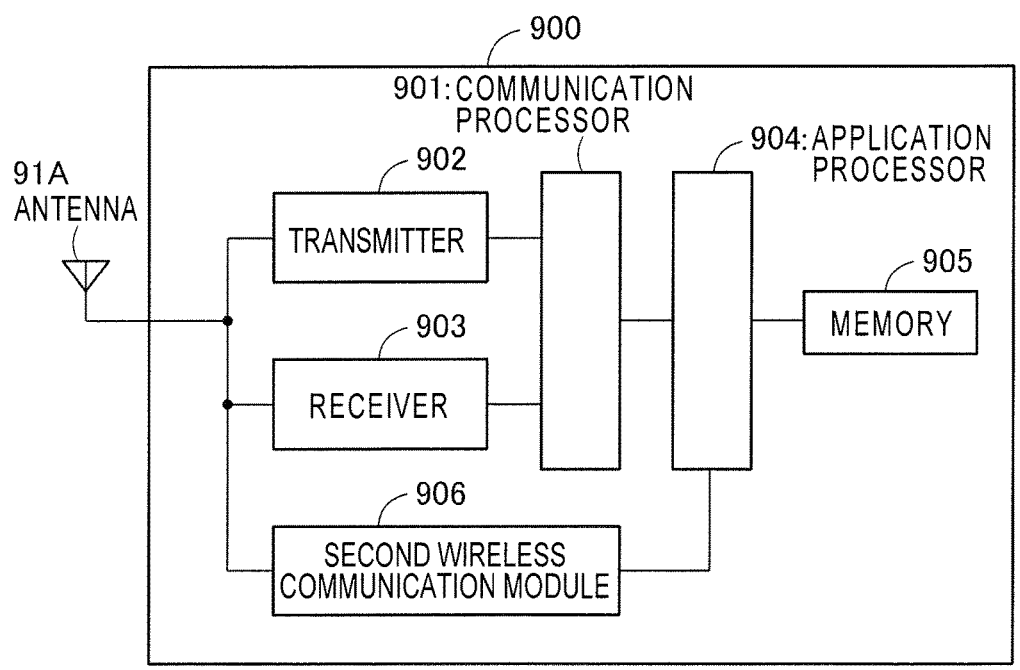
FIG. 12 is a functional block diagram of a terminal or an access point according to an embodiment.

FIG. 12 is a functional block diagram of the terminal (STA) 900 according to the present embodiment. The STA 900 includes a communication processor 901, a transmitter 902, a receiver 903, an antenna 91A, an application processor 904 a memory 905, and a second wireless communication module 906. The base station (AP) may have the similar configuration.

The communication processor 901 has the functions similar to MAC/PHY manager as described in the first embodiment. The transmitter 902 and the receiver 903 have the functions similar to PHY processor and MAC processor as described in the first embodiment. The transmitter 902 and the receiver 903 may perform analog domain processing in PHY processor and the communication processor 901 may perform digital domain processing in MAC processor and digital domain processing in PHY processor. The communication processor 901 may internally possess a buffer for transferring data to and from the application processor 904. The buffer may be a volatile memory, such as an SRAM or a DRAM, or may be a non-volatile memory, such as a NAND or an MRAM.

The application processor 904 performs wireless communication through the communication processor 901, data writing or reading with the memory 905 and wireless communication through the second wireless communication module 906. The application processor 904 performs various processing such as Web browsing or multimedia processing of video or music or the like. The operation of application processor 904 may be carried out by software (program) processing by a processor such as CPU, by hardware, or both of them.

The memory 905 saves data received at the receiver 903 or the second wireless communication module 906, or data processed by the application processor 904. The memory 905 may be a volatile memory such as a DRAM or may be a non-volatile memory, such as a NAND or an MRAM. The memory 905 may be an SSD, an HDD, an SD card, or an eMMC or the like. The memory 905 may be arranged out of the access point 900.

The second wireless communication module 906 has the similar configuration to the WLAN module as shown in FIG. 10 or FIG. 11 as one example. The second wireless communication module 906 performs wireless communication in a different manner than that realized by the communication processor 901, the transmitter 902 and the receiver 903. For example, in a case that the communication processor 901, the transmitter 902 and the receiver 903 perform wireless communication in compliance with IEEE802.11 standard, the second wireless communication module 906 may perform wireless communication in compliance with another wireless communication standard such as Bluetooth (trademark), LTE, Wireless HD or the like. The communication processor 901, the transmitter 902, the receiver 903 may perform wireless communication at 2.4 GHz/5 GHz and the second wireless communication module 906 may perform wireless communication at 60 GHz.

In the embodiment, one antenna is arranged and shared by the transmitter 902, the receiver 903 and the second wireless communication module 906. A switch controlling for connection destination of the antenna 91A may be arranged and thereby the antenna may be shared. A plurality of antennas may be arranged and may be employed by the transmitter 902, the receiver 903, and the second wireless communication module 906, respectively.

As one example, the communication processor 901 corresponds to an integrated circuit, and the transmitter 902 and the receiver 903 corresponds to an RF integrated circuit which transmits and receives frames. A set of the communication processor 901 and the application processor 904 is configured by one integrated circuit (1 chip). A part of the second wireless communication module 906 and the application processor 904 may be configured by one integrated circuit (1 chip).

The application processor performs control of wireless communication through the communication processor 901 and wireless communication through the second wireless communication module 906.

(Eighth Embodiment)

Figure 13A:
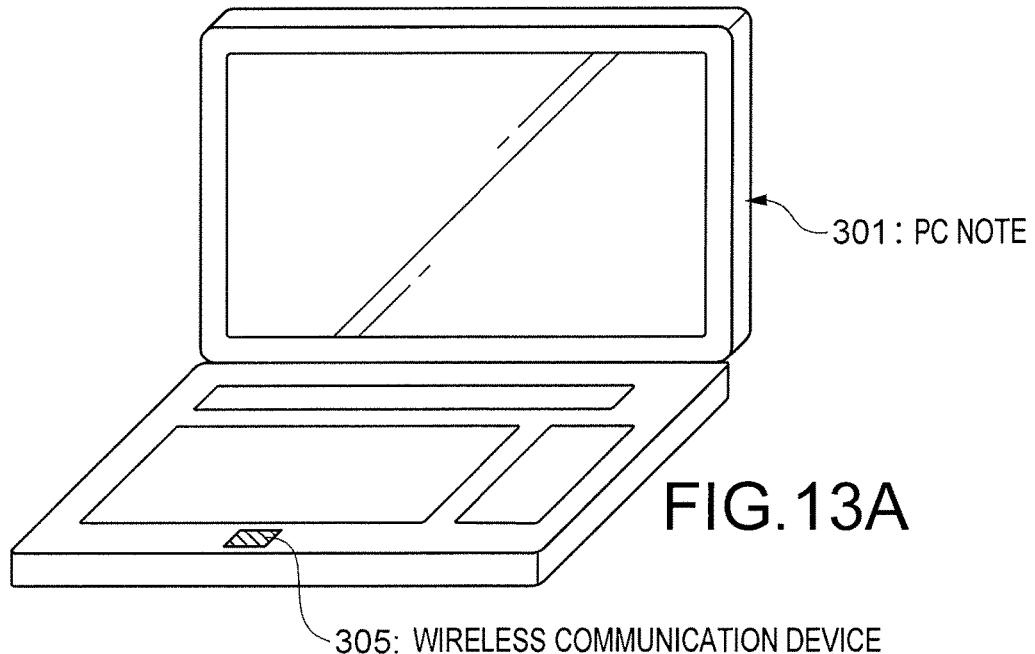
FIGS. 13A and 13B are perspective views of a terminal according to an embodiment.
Figure 13B:
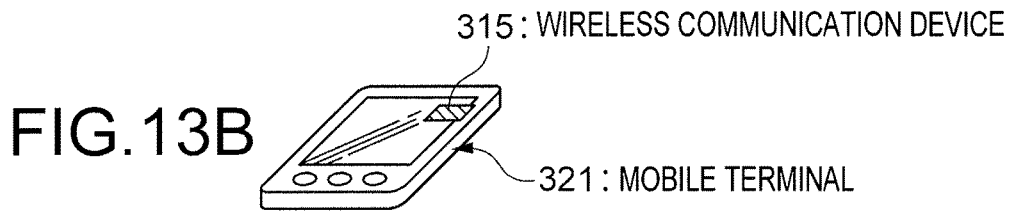

FIG. 13A and FIG. 13B are perspective views of wireless terminal according to the present embodiment. The wireless terminal in FIG. 13A is a notebook PC 301 and the wireless communication device (or a wireless device) in FIG. 13B is a mobile terminal 321. Each of them corresponds to one form of a terminal (which may indicate a base station). The notebook PC 301 and the mobile terminal 321 are equipped with wireless communication devices 305 and 315, respectively. The wireless communication device provided in a terminal (which may indicate a base station) which has been described above can be used as the wireless communication devices 305 and 315. A wireless terminal carrying a wireless communication device is not limited to notebook PCs and mobile terminals. For example, it can be installed in a TV, a digital camera, a wearable device, a tablet, a smart phone, a gaming device, a network storage device, a monitor, a digital audio player, a web camera, a video camera, a projector, a navigation system, an external adapter, an internal adapter, a set top box, a gateway, a printer server, a mobile access point, a router, an enterprise/service provider access point, a portable device, a handheld device, a vehicle and so on.

Figure 14:
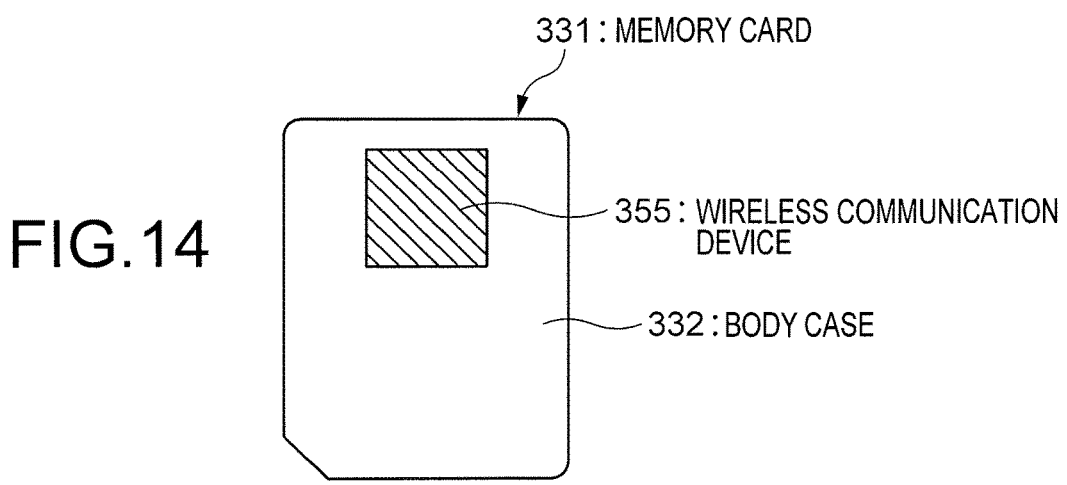
FIG. 14 is a diagram showing a memory card according to one embodiment.

Moreover, a wireless communication device installed in a terminal (which may indicate a base station) can also be provided in a memory card. FIG. 14 illustrates an example of a wireless communication device mounted on a memory card. A memory card 331 contains a wireless communication device 355 and a body case 332. The memory card 331 uses the wireless communication device 355 for wireless communication with external devices. Here, in FIG. 14, the description of other installed elements (for example, a memory, and so on) in the memory card 331 is omitted.

(Ninth Embodiment)

In the present embodiment, a bus, a processor unit and an external interface unit are provided in addition to the configuration of the wireless communication device (the wireless communication device of the terminal (which may indicate the base station)) according to any of the above embodiments. The processor unit and the external interface unit are connected with an external memory (a buffer) through the bus. A firmware operates the processor unit. Thus, by adopting a configuration in which the firmware is included in the wireless communication device, the functions of the wireless communication device can be easily changed by rewriting the firmware. The processing unit in which the firmware operates may be a processor that performs the process of the communication controlling device or the control unit according to the present embodiment, or may be another processor that performs a process relating to extending or altering the functions of the process of the communication controlling device or the control unit. The processing unit in which the firmware operates may be included in the access point or the wireless terminal according to the present embodiment. Alternatively, the processing unit may be included in the integrated circuit of the wireless communication device installed in the access point, or in the integrated circuit of the wireless communication device installed in the wireless terminal.

(Tenth Embodiment)

In the present embodiment, a clock generating unit is provided in addition to the configuration of the wireless communication device (the wireless communication device of the terminal (which may indicate the base station)) according to any of the above embodiments. The clock generating unit generates a clock and outputs the clock from an output terminal to the exterior of the wireless communication device. Thus, by outputting to the exterior the clock generated inside the wireless communication device and operating the host by the clock output to the exterior, it is possible to operate the host and the wireless communication device in a synchronized manner.

(Eleventh Embodiment)

In the present embodiment, a power source unit, a power source controlling unit and a wireless power feeding unit are included in addition to the configuration of the wireless communication device (the wireless communication device of the terminal (which may indicate the base station)) according to any of the above embodiments. The power supply controlling unit is connected to the power source unit and to the wireless power feeding unit, and performs control to select a power source to be supplied to the wireless communication device. Thus, by adopting a configuration in which the power source is included in the wireless communication device, power consumption reduction operations that control the power source are possible.

(Twelfth Embodiment)

In the present embodiment, a SIM card is added to the configuration of the wireless communication device according to any of the above embodiments. For example, the SIM card is connected with the controller, the transmitter, the receiver or plural of them in the wireless communication device. Thus, by adopting a configuration in which the SIM card is included in the wireless communication device, authentication processing can be easily performed.

(Thirteenth Embodiment)

In the present embodiment, a video image compressing/decompressing unit is added to the configuration of the wireless communication device according to any of the above embodiments. The video image compressing/decompressing unit is connected to the bus. Thus, by adopting a configuration in which the video image compressing/decompressing unit is included in the wireless communication device, transmitting a compressed video image and decompressing a received compressed video image can be easily done.

(Fourteenth Embodiment)

In the present embodiment, an LED unit is added to the configuration of the wireless communication device (the wireless communication device of the terminal (which may indicate the base station)) according to any of the above embodiments. For example, the LED unit is connected to the controller, the transmitter, the receiver or plural of them in the wireless communication device. Thus, by adopting a configuration in which the LED unit is included in the wireless communication device, notifying the operation state of the wireless communication device to the user can be easily done.

(Fifteenth Embodiment)

In the present embodiment, a vibrator unit is included in addition to the configuration of the wireless communication device wireless communication device (the wireless communication device of the terminal (which may indicate the base station)) according to any of the above embodiments. For example, the vibrator unit is connected to at least one of the controller, the transmitter, the receiver or plural of them in the wireless communication device. Thus, by adopting a configuration in which the vibrator unit is included in the wireless communication device, notifying the operation state of the wireless communication device to the user can be easily done.

(Sixteenth Embodiment)

In the present embodiment, the configuration of the wireless communication device includes a display in addition to the configuration of the wireless communication device (the wireless communication device of the terminal (which may indicate the base station)) according to any one of the above embodiments. The display may be connected to the controller, the transmitter, the receiver or plural of them in the wireless communication device via a bus (not shown). As seen from the above, the configuration including the display to display the operation state of the wireless communication device on the display allows the operation status of the wireless communication device to be easily notified to a user.

(Seventeenth Embodiment)

In the present embodiment, [1] the frame type in the wireless communication system, [2] a technique of disconnection between wireless communication devices, [3] an access scheme of a wireless LAN system and [4] a frame interval of a wireless LAN are described.

[1] Frame Type in Communication System

Generally, as mentioned above, frames treated on a wireless access protocol in a wireless communication system are roughly divided into three types of the data frame, the management frame and the control frame. These types are normally shown in a header part which is commonly provided to frames. As a display method of the frame type, three types may be distinguished in one field or may be distinguished by a combination of two fields. In IEEE 802.11 standard, identification of a frame type is made based on two fields of Type and Subtype in the Frame Control field in the header part of the MAC frame. The Type field is one for generally classifying frames into a data frame, a management frame, or a control frame and the Subtype field is one for identifying more detailed type in each of the classified frame types such as a beacon frame belonging to the management frame.

The management frame is a frame used to manage a physical communication link with a different wireless communication device. For example, there are a frame used to perform communication setting with the different wireless communication device or a frame to release communication link (that is, to disconnect the connection), and a frame related to the power save operation in the wireless communication device.

The data frame is a frame to transmit data generated in the wireless communication device to the different wireless communication device after a physical communication link with the different wireless communication device is established. The data is generated in a higher layer of the present embodiment and generated by, for example, a user's operation.

The control frame is a frame used to perform control at the time of transmission and reception (exchange) of the data frame with the different wireless communication device. A response frame transmitted for the acknowledgment in a case where the wireless communication device receives the data frame or the management frame, belongs to the control frame. The response frame is, for example, an ACK frame or a BlockACK frame. The RTS frame and the CTS frame are also the control frame.

These three types of frames are subjected to processing based on the necessity in the physical layer and then transmitted as physical packets via an antenna. In IEEE 802.11 standard (including the extended standard such as IEEE Std 802.11ac-2013), an association process is defined as one procedure for connection establishment. The association request frame and the association response frame which are used in the procedure are a management frame. Since the association request frame and the association response frame is the management frame transmitted in a unicast scheme, the frames causes the wireless communication terminal in the receiving side to transmit an ACK frame being a response frame. The ACK frame is a control frame as described in the above.

[2] Technique of Disconnection Between Wireless Communication Devices

For disconnection of the connection (release), there are an explicit technique and an implicit technique. As the explicit technique, a frame to disconnect any one of the connected wireless communication devices is transmitted. This frame corresponds to Deauthentication frame defined in IEEE 802.11 standard and is classified into the management frame. Normally, it is determined that the connection is disconnected at the timing of transmitting the frame to disconnect the connection in a wireless communication device on the side to transmit the frame and at the timing of receiving the frame to disconnect the connection in a wireless communication device on the side to receive the frame. Afterward, it returns to the initial state in a communication phase, for example, a state to search for a wireless communication device of the communicating partner. In a case that the wireless communication base station disconnects with a wireless communication terminal, for example, the base station deletes information on the wireless communication device from a connection management table if the base station holds the connection management table for managing wireless communication terminals which entries into the BSS of the base station-self. For example, in a case that the base station assigns an AID to each wireless communication terminal which entries into the BSS at the time when the base station permitted each wireless communication terminal to connect to the base station-self in the association process, the base station deletes the held information related to the AID of the wireless communication terminal disconnected with the base station and may release the AID to assign it to another wireless communication device which newly entries into the BSS. On the other hand, as the implicit technique, it is determined that the connection state is disconnected in a case where frame transmission (transmission of a data frame and management frame or transmission of a response frame with respect to a frame transmitted by the subject device) is not detected from a wireless communication device of the connection partner which has established the connection for a certain period. Such a technique is provided because, in a state where it is determined that the connection is disconnected as mentioned above, a state is considered where the physical wireless link cannot be secured, for example, the communication distance to the wireless communication device of the connection destination is separated and the radio signals cannot be received or decoded. That is, it is because the reception of the frame to disconnect the connection cannot be expected.

As a specific example to determine the disconnection of connection in an implicit method, a timer is used. For example, at the time of transmitting a data frame that requests an acknowledgment response frame, a first timer (for example, a retransmission timer for a data frame) that limits the retransmission period of the frame is activated, and, if the acknowledgement response frame to the frame is not received until the expiration of the first timer (that is, until a desired retransmission period passes), retransmission is performed. When the acknowledgment response frame to the frame is received, the first timer is stopped.

On the other hand, when the acknowledgment response frame is not received and the first timer expires, for example, a management frame to confirm whether a wireless communication device of a connection partner is still present (in a communication range) (in other words, whether a wireless link is secured) is transmitted, and, at the same time, a second timer (for example, a retransmission timer for the management frame) to limit the retransmission period of the frame is activated. Similarly to the first timer, even in the second timer, retransmission is performed if an acknowledgment response frame to the frame is not received until the second timer expires, and it is determined that the connection is disconnected when the second timer expires.

Alternatively, a third timer is activated when a frame is received from a wireless communication device of the connection partner, the third timer is stopped every time the frame is newly received from the wireless communication device of the connection partner, and it is activated from the initial value again. When the third timer expires, similarly to the above, a management frame to confirm whether the wireless communication device of the connection party is still present (in a communication range) (in other words, whether a wireless link is secured) is transmitted, and, at the same time, a second timer (for example, a retransmission timer for the management frame) to limit the retransmission period of the frame is activated. Even in this case, retransmission is performed if an acknowledgment response frame to the frame is not received until the second timer expires, and it is determined that the connection is disconnected when the second timer expires. The latter management frame to confirm whether the wireless communication device of the connection partner is still present may differ from the management frame in the former case. Moreover, regarding the timer to limit the retransmission of the management frame in the latter case, although the same one as that in the former case is used as the second timer, a different timer may be used.

[3] Access Scheme of Wireless LAN System

For example, there is a wireless LAN system with an assumption of communication or competition with a plurality of wireless communication devices. CSMA/CA is set as the basis of an access scheme in IEEE802.11 (including an extension standard or the like) wireless LAN. In a scheme in which transmission by a certain wireless communication device is grasped and transmission is performed after a fixed time from the transmission end, simultaneous transmission is performed in the plurality of wireless communication devices that grasp the transmission by the wireless communication device, and, as a result, radio signals collide and frame transmission fails. By grasping the transmission by the certain wireless communication device and waiting for a random time from the transmission end, transmission by the plurality of wireless communication devices that grasp the transmission by the wireless communication device stochastically disperses. Therefore, if the number of wireless communication devices in which the earliest time in a random time is subtracted is one, frame transmission by the wireless communication device succeeds and it is possible to prevent frame collision. Since the acquisition of the transmission right based on the random value becomes impartial between the plurality of wireless communication devices, it can say that a scheme adopting Collision Avoidance is a suitable scheme to share a radio medium between the plurality of wireless communication devices.

[4] Frame Interval of Wireless LAN

The frame interval of IEEE802.11 wireless LAN is described. There are several types of frame intervals used in IEEE802.11 wireless LAN, such as distributed coordination function interframe space (DIFS), arbitration interframe space (AIFS), point coordination function interframe space (PIFS), short interframe space (SIFS), extended interframe space (EIFS) and reduced interframe space (RIFS).

The definition of the frame interval is defined as a continuous period that should confirm and open the carrier sensing idle before transmission in IEEE802.11 wireless LAN, and a strict period from a previous frame is not discussed. Therefore, the definition is followed in the explanation of IEEE802.11 wireless LAN system. In IEEE802.11 wireless LAN, a waiting time at the time of random access based on CSMA/CA is assumed to be the sum of a fixed time and a random time, and it can say that such a definition is made to clarify the fixed time.

DIFS and AIFS are frame intervals used when trying the frame exchange start in a contention period that competes with other wireless communication devices on the basis of CSMA/CA. DIFS is used in a case where priority according to the traffic type is not distinguished, AIFS is used in a case where priority by traffic identifier (TID) is provided.

Since operation is similar between DIFS and AIFS, an explanation below will mainly use AIFS. In IEEE802.11 wireless LAN, access control including the start of frame exchange in the MAC layer is performed. In addition, in a case where QoS (Quality of Service) is supported when data is transferred from a higher layer, the traffic type is notified together with the data, and the data is classified for the priority at the time of access on the basis of the traffic type. The class at the time of this access is referred to as "access category (AC)". Therefore, the value of AIFS is provided every access category.

PIFS denotes a frame interval to enable access which is more preferential than other competing wireless communication devices, and the period is shorter than the values of DIFS and AIFS. SIFS denotes a frame interval which can be used in a case where frame exchange continues in a burst manner at the time of transmission of a control frame of a response system or after the access right is acquired once. EIFS denotes a frame interval caused when frame reception fails (when the received frame is determined to be error).

RIFS denotes a frame interval which can be used in a case where a plurality of frames are consecutively transmitted to the same wireless communication device in a burst manner after the access right is acquired once, and a response frame from a wireless communication device of the transmission partner is not requested while RIFS is used.

Figure 15:
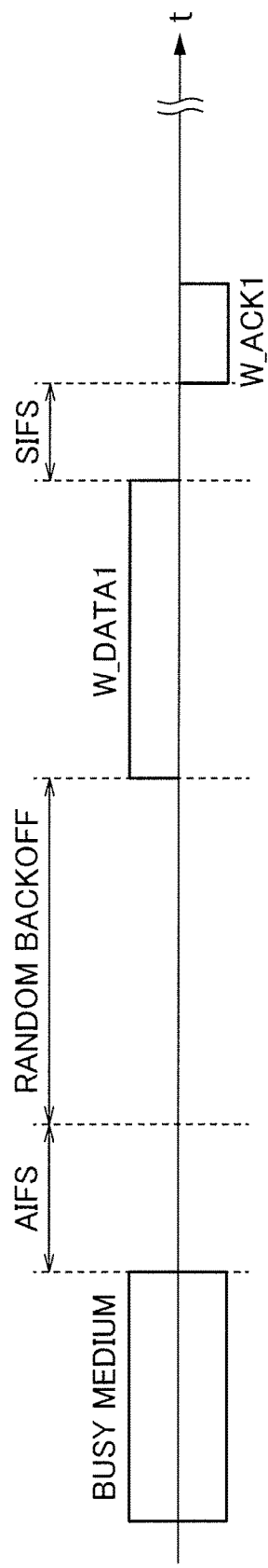
FIG. 15 is a diagram showing an example of a frame exchange in a contention period according to an embodiment.

Here, FIG. 15 illustrates one example of frame exchange in a competitive period based on the random access in IEEE802.11 wireless LAN.

When a transmission request of a data frame (W_DATA1) is generated in a certain wireless communication device, a case is assumed where it is recognized that a medium is busy (busy medium) as a result of carrier sensing. In this case, AIFS of a fixed time is set from the time point at which the carrier sensing becomes idle, and, when a random time (random backoff) is set afterward, data frame W_DATA1 is transmitted to the communicating partner.

The random time is acquired by multiplying a slot time by a pseudorandom integer led from uniform distribution between contention windows (CW) given by integers from 0. Here, what multiplies CW by the slot time is referred to as "CW time width". The initial value of CW is given by CWmin, and the value of CW is increased up to CWmax every retransmission. Similarly to AIFS, both CWmin and CWmax have values every access category. In a wireless communication device of transmission destination of W_DATA1, when reception of the data frame succeeds, a response frame (W_ACK1) is transmitted after SIFS from the reception end time point. If it is within a transmission burst time limit when W_ACK1 is received, the wireless communication device that transmits W_DATA1 can transmit the next frame (for example, W_DATA2) after SIFS.

Although AIFS, DIFS, PIFS and EIFS are functions between SIFS and the slot-time, SIFS and the slot time are defined every physical layer. Moreover, although parameters whose values being set according to each access category, such as AIFS, CWmin and CWmax, can be set independently by a communication group (which is a basic service set (BSS) in IEEE802.11 wireless LAN), the default values are defined.

For example, in the definition of 802.11ac, with an assumption that SIFS is 16 μs and the slot time is 9 μs, and thereby PIFS is 25 μs, DIFS is 34 μs, the default value of the frame interval of an access category of BACKGROUND (AC_BK) in AIFS is 79 μs, the default value of the frame interval of BEST EFFORT (AC_BE) is 43 μs, the default value of the frame interval between VIDEO(AC_VI) and VOICE(AC_VO) is 34 μs, and the default values of CWmin and CWmax are 31 and 1023 in AC_BK and AC_BE, 15 and 31 in AC_VI and 7 and 15 in AC_VO. Here, EIFS denotes the sum of SIFS, DIFS, and the time length of a response frame transmitted at the lowest mandatory physical rate. In the wireless communication device which can effectively takes EIFS, it may estimate an occupation time length of a PHY packet conveying a response frame directed to a PHY packet due to which the EIFS is caused and calculates a sum of SIFS, DIFS and the estimated time to take the EIFS. Note that the frames described in the embodiments may indicate not only things called frames in, for example, IEEE 802.11 standard, but also things called packets, such as Null Data Packets.

The terms used in each embodiment should be interpreted broadly. For example, the term "processor" may encompass a general purpose processor, a central processing unit (CPU), a microprocessor, a digital signal processor (DSP), a controller, a microcontroller, a state machine, and so on. According to circumstances, a "processor" may refer to an application specific integrated circuit (ASIC), a field programmable gate array (FPGA), and a programmable logic device (PLD), etc. The term "processor" may refer to a combination of processing devices such as a plurality of microprocessors, a combination of a DSP and a microprocessor, or one or more microprocessors in conjunction with a DSP core.

As another example, the term "memory" may encompass any electronic component which can store electronic information. The "memory" may refer to various types of media such as a random access memory (RAM), a read-only memory (ROM), a programmable read-only memory (PROM), an erasable programmable read only memory (EPROM), an electrically erasable PROM (EEPROM), a non-volatile random access memory (NVRAM), a flash memory, and a magnetic or optical data storage, which are readable by a processor. It can be said that the memory electronically communicates with a processor if the processor read and/or write information for the memory. The memory may be arranged within a processor and also in this case, it can be said that the memory electronically communication with the processor. The circuitry" may refer one or more electric circuits disposed on a single chip, or may refer one or more electric circuits disposed on a plurality of chips or a plurality of devices in a dispersed manner.

In the specification, the expression "at least one of a, b or c" is an expression to encompass not only "a", "b", "c", "a and b", "a and c", "b and c", "a, b and c" or any combination thereof but also a combination of at least a plurality of same elements such as "a and a", "a, b and b" or "a, a, b, b, c and c". Also, the expression is an expression to allow a set including an element other than "a", "b" and "c" such as "a, b, c, and d".

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions.

The invention claimed is:

1. An electronic apparatus comprising:
    controller circuitry configured to:
        judge whether a payload for a first packet comprises retransmission data;
        set a first PHY header for the first packet, the first PHY header comprising a first signal field modulated by a first modulation method, when the payload does not comprise the retransmission data;
        set a second PHY header for the first packet, the second PHY header comprising a second signal field modulated by a second modulation method different from the first modulation method, when the payload includes the retransmission data, wherein the second PHY header comprises an amount of information larger than an amount of information of the first PHY header; and
        generate the first packet comprising the payload and either one of the first PHY header or the second PHY header set for the first packet;
    transmitter circuitry configured to transmit the first packet; and
    receiver circuitry configured to receive an ACK signal or a NACK signal for the first packet.

2. The electronic apparatus according to claim 1, wherein the modulation method of the first signal field is BPSK and the modulation method of the second signal field is QBPSK.

3. The electronic apparatus according to claim 1, wherein the modulation method of the first signal field is QBPSK and the modulation method of the second signal field is BPSK.

4. An electronic apparatus comprising:
    controller circuitry configured to:
        judge whether a payload for a first packet comprises retransmission data;
        set a first PHY header for the first packet, when the payload does not comprise the retransmission data;
        set a second PHY header for the first packet, when the payload includes the retransmission data, wherein the second PHY header comprises an amount of information larger than an amount of information of the first PHY header; and
        generate the first packet comprising the payload and either one of the first PHY header or the second PHY header set for the first packet;
    transmitter circuitry configured to transmit the first packet; and
    receiver circuitry configured to receive an ACK signal or a NACK signal for the first packet, wherein the second PHY header comprises a scrambling initial value used to scramble the packet data.

5. The electronic apparatus according to claim 1, wherein the second PHY header comprises an extension signal field that is not included in the first PHY header, the extension signal field comprising a destination address of the packet data.

6. The electronic apparatus according to claim 1, wherein the second PHY header comprises an extension signal field that is not included in the first PHY header, the extension signal field comprising at least one of information regarding a sequence number, a frame size, or frame order of a MAC frame of the packet data.

7. The electronic apparatus according to claim 1, wherein the second PHY header comprises an extension signal field that is not included in the first PHY header, the extension signal field comprising a field to designate a processing method of likelihood synthesis of the packet data.

8. The electronic apparatus according to claim 7, wherein the processing method of the likelihood synthesis is any one of a chase combining (CC) method, an incremental redundancy (IR) method, and a CC-IR method.

9. A wireless communication method comprising:
    transmitting packet data comprising a first PHY header and a payload, the first PHY header comprising a first signal field modulated by a first modulation method, when the packet data do not comprise retransmission data; and
    transmitting the packet data comprising a second PHY header and the payload, the second PHY header comprising a second signal field modulated by a second modulation method different from the first modulation method, when the packet data comprise the retransmission data, wherein the second PHY header comprises an amount of information larger than an amount of information of the first PHY header.

10. The electronic apparatus according to claim 4, wherein the second PHY header comprises an extension signal field that is not comprised in the first PHY header, the extension signal field comprising a destination address of the packet data.

11. The electronic apparatus according to claim 4, wherein the second PHY header comprises an extension signal field that is not included in the first PHY header, the extension signal field comprising at least one of information regarding a sequence number, a frame size, and frame order of a MAC frame of the packet data.

12. The electronic apparatus according to claim 4, wherein the second PHY header comprises an extension signal field that is not included in the first PHY header, the extension signal field comprising a field to designate a processing method of likelihood synthesis of the packet data.

13. The electronic apparatus according to claim 12, wherein the processing method of the likelihood synthesis is any one of a chase combining (CC) method, an incremental redundancy (IR) method, and a CC-IR method.

* * * * *